(12) United States Patent
Onishi

(10) Patent No.: US 8,674,286 B2
(45) Date of Patent: Mar. 18, 2014

(54) OPTICAL POSITION DETECTION DEVICE AND APPARATUS WITH POSITION DETECTION FUNCTION

(75) Inventor: Yasunori Onishi, Shiojiri (JP)

(73) Assignee: Seiko Epson Corporation (JP)

( * ) Notice: Subject to any disclaimer, the term of this patent is extended or adjusted under 35 U.S.C. 154(b) by 258 days.

(21) Appl. No.: 13/326,375

(22) Filed: Dec. 15, 2011

(65) Prior Publication Data

US 2012/0153121 A1    Jun. 21, 2012

(30) Foreign Application Priority Data

Dec. 16, 2010   (JP) ................................ 2010-280188

(51) Int. Cl.
*G01C 21/00* (2006.01)

(52) U.S. Cl.
USPC ......... 250/221; 250/206.1; 345/175; 356/614

(58) Field of Classification Search
USPC ................. 250/206.1, 221; 345/175; 356/614
See application file for complete search history.

(56) References Cited

U.S. PATENT DOCUMENTS

| | | | |
|---|---|---|---|
| 6,953,926 B2 | 10/2005 | Reime | |
| 8,432,377 B2 * | 4/2013 | Newton | ........................ 345/175 |
| 8,525,814 B2 * | 9/2013 | Hsiao et al. | .................... 345/175 |
| 8,542,350 B2 * | 9/2013 | Nakanishi | ........................ 356/51 |
| 2009/0161051 A1 | 6/2009 | Fukunaga et al. | |
| 2012/0298840 A1 * | 11/2012 | Kiyose | ........................ 250/206.1 |

FOREIGN PATENT DOCUMENTS

| | | |
|---|---|---|
| JP | 2002-091685 | 3/2002 |
| JP | 2003-323252 | 11/2003 |
| JP | 2003-534554 | 11/2003 |
| JP | 2008-276325 | 11/2008 |
| JP | 2009-151039 | 7/2009 |
| JP | 2009-217486 | 9/2009 |
| JP | 2009-295318 | 12/2009 |
| JP | 2010-127671 | 6/2010 |
| JP | 2011-237360 | 11/2011 |

\* cited by examiner

*Primary Examiner* — Tony Ko
(74) *Attorney, Agent, or Firm* — Harness, Dickey & Pierce, P.L.C.

(57) ABSTRACT

An optical position detection device that detects a position of a target object, includes plural detection light sources that output detection light, a light source drive unit that drives the plural detection light sources, a first light receiving unit that receives the detection light reflected by the target object located in an output space of the detection light, a compensation light source unit that outputs compensation light that enters outside the output space, a second light receiving unit that receives the compensation light, and a position detection unit that detects the position of the target object based on a difference between first received light intensity in the first light receiving unit and second received light intensity in the second light receiving unit.

10 Claims, 18 Drawing Sheets

OPTICAL POSITION DETECTION DEVICE AND APPARATUS WITH POSITION DETECTION FUNCTION

BACKGROUND

The entire disclosure of Japanese Patent Application No. 2010-280188, filed Dec. 16, 2010 is expressly incorporated by reference herein.

1. Technical Field

The present invention relates to an optical position detection device that optically detects a position of a target object and an apparatus with a position detection function including the optical position detection device.

2. Related Art

As an optical position detection device that optically detects a target object, for example, a device in which detection light is output from respective plural detection light sources via a light-transmissive member toward the target object and the detection light reflected by the target object is transmitted through the light-transmissive member and detected in a light receiving unit has been suggested. In the optical position detection device having the configuration, the position of the target object is detected based on the detection result of the detection light in the light receiving unit. See Japanese Patent Publication No.

Further, a system in which a light-guiding plate is provided in an optical position detection device and detection light output from respective detection light sources is output via the light guiding plate toward a target object and the detection light reflected by the target object is detected in a light receiving unit has been proposed. See Japanese Laid-Open Publication numbers JP-A-2010-127671 and JP-A-2009-295318.

When the optical position detection devices disclosed in the above Japanese publication documents are actually used, detection light reflected by an object other than the target object in addition to the detection light reflected by the target object enter the light receiving unit. Therefore, there is a problem that position detection accuracy of the target object is low. For example, in the optical position detection device disclosed in JP-T-2003-534554, detection light reflected on the rear surface side of the light-transmissive member enter the light receiving unit. Further, in the optical position detection devices disclosed in JP-A-2010-127671 and JP-A-2009-127671, when an object other than the target object such as an accessory exists in the output space of the detection light, the detection light reflected by the object enter the light receiving unit.

Note that, in the case in which ambient light such as outdoor light enters the light receiving unit in addition to the detection light reflected by the target object and the detection light reflected by the other object than the target object, the influence of the ambient light may be eliminated relatively easily unlike the influence of the detection light reflected by the other object than the target object. For example, in the case in which pulse-modulated light is used as detection light, because received light signals of the detection light reflected by the target object are high-frequency signals and received light signals of ambient light are low-frequency signals, the received light signals corresponding to the ambient light may be eliminated relatively easily using a high-pass filter. Furthermore, if the position of the target object is detected using a drive condition for the detection light sources when the detection light sources are differentially driven so that detection intensity may be equal in the light receiving unit, the influence of ambient light may be eliminated. Note that, in these methods, it is impossible to eliminate the influence of the detection light reflected by the other object than the target object.

SUMMARY

An advantage of some aspects of the invention is to provide an optical position detection device that can detect a position of a target object without being affected by the influence of detection light reflected by an object other than the target object and provide an apparatus with a position detection function including the optical position detection device.

An aspect of the invention is directed to an optical position detection device that detects a position of a target object, including plural detection light sources that output detection light, a light source drive unit that drives the plural detection light sources, a first light receiving unit that receives the detection light reflected by the target object located in an output space of the detection light, a compensation light source unit that outputs compensation light that does not enter the output space, a second light receiving unit that does not receive the detection light, but receives the compensation light, and a position detection unit that detects the position of the target object based on a first difference between first received light intensity in the first light receiving unit and second received light intensity in the second light receiving unit.

In the aspect of the invention, a configuration having a compensation light source control unit that controls the compensation light source unit so that the second received light intensity of the compensation light in the second light receiving unit may be the first received light intensity in the first light receiving unit of the detection light reflected by an object other than the target object may be employed.

In the aspect of the invention, plural detection light sources that output detection light are used. When the plural detection light sources are sequentially turned on, the first light receiving unit receives the detection light reflected by the target object. Therefore, by directly using a detection result in the first light receiving unit or using a drive condition of drive current values when the detection light sources are differentially driven based on the first received light intensity in the first light receiving unit, the position of the target object may be detected. Here, in the first light receiving unit, in some cases, the detection light reflected by the other object than the target object enters in addition to the detection light reflected by the target object. And, in the aspect of the invention, the compensation light source unit that outputs compensation light that does not enter the output space and the second light receiving unit that does not receive the detection light, but receives the compensation light are provided. Therefore, if the second received light intensity of the compensation light in the second light receiving unit is set to the first received light intensity in the first light receiving unit of the detection light reflected by the other object than the target object, and then, when the position of the target object is detected based on the first difference between the first received light intensity in the first light receiving unit and the second received light intensity in the second light receiving unit in the position detection unit, in its detection result, the influence of the detection light reflected by the other object than the target object has been automatically removed. Thus, the position of the target object may be detected without being affected by the detection light reflected by the other object than the target object.

In the aspect of the invention, a configuration in which the light source drive unit executes a first operation of allowing part of the plural detection light sources to output the detection light and a second operation of allowing the other part of the detection light sources to output the detection light, and the position detection unit detects the position of the target object based on a second difference between third received light intensity in the first light receiving unit and fourth received light intensity in the second light receiving unit at the first operation, and a third difference between fifth received light intensity in the first light receiving unit and sixth received light intensity in the second light receiving unit at the second operation may be employed. Even in the case of employing the detection principle of executing the first operation of allowing part of the plural detection light sources to output the detection light and the second operation of allowing the other part of the detection light sources to output the detection light, in the aspect of the invention, the differences between the received light intensity in the first light receiving unit and the received light intensity in the second light receiving unit are used, and the position of the target object may be detected without being affected by the detection light reflected by the other object than the target object.

In the aspect of the invention, it is preferable that the position detection unit controls the light source drive unit so that the second difference between the third received light intensity in the first light receiving unit and the fourth received light intensity in the second light receiving unit at the first operation and the third difference between the fifth received light intensity in the first light receiving unit and the sixth received light intensity in the second light receiving unit at the second operation may be equal, and detects the position of the target object based on a first drive condition for the detection light sources at the first operation and a second drive condition for the detection light sources at the second operation, and first output intensity of the compensation light output from the compensation light source unit changes, at the first operation, in conjunction with second output intensity of the detection light output from the detection light sources at the first operation, and the first output intensity changes, at the second operation, in conjunction with third output intensity of the detection light output from the detection light sources at the second operation. According to the configuration, when the detection light sources are differentially driven, even in the case in which the drive condition of the drive currents supplied to the detection light sources change, the first output intensity of the compensation light output from the compensation light source unit also changes, and the position of the target object may be detected without being affected by the detection light reflected by the other object than the target object.

In the aspect of the invention, it is preferable that the light source drive unit supplies power, at the first operation, to the detection light sources that output the detection light at the first operation and to the compensation light source unit, and the light source drive unit supplies power, at the second operation, to the detection light sources that output the detection light at the second operation and to the compensation light source unit. According to the configuration, the detection light sources and the compensation light source unit may be driven by the common light source drive unit. And the circuit configuration may be simplified. Further, although the drive condition of the drive currents supplied to the detection light sources changes when the detection light sources are differentially driven, it is easy to change the output intensity of the compensation light output from the compensation light source unit in response to the change.

In the aspect of the invention, it is preferable that a compensation drive current setting unit that respectively defines a first ratio between a first drive current supplied to the detection light sources that output the detection light and a second drive current supplied to the compensation light source unit at the first operation and a second ratio between a third drive current supplied to the detection light sources that output the detection light and a fourth drive current supplied to the compensation light source unit at the second operation is provided. According to the configuration, even when an amount of light of the detection light output from the detection light sources, reflected by the other object than the target object, and entering the first light receiving unit at the first operation and an amount of light of the detection light output from the detection light sources, reflected by the other object than the target object, and entering the first light receiving unit at the second operation are different, the influence of the detection light reflected by the other object than the target object and entering the first light receiving unit may be properly eliminated.

In the aspect of the invention, it is preferable that the compensation light source unit includes a first compensation light source that outputs first compensation light as the compensation light at the first operation and a second compensation light source that outputs second compensation light as the compensation light at the second operation. According to the configuration, it is easy to output the compensation light having proper intensity at the first operation and the second operation.

In the aspect of the invention, it is preferable that the first light receiving unit is a first photoelectric conversion element, and the second light receiving unit is a second photoelectric conversion element electrically connected in parallel with opposite polarity to the first photoelectric conversion element. According to the configuration, the difference between the received light intensity in the first light receiving unit and the received light intensity in the second light receiving unit is output from the connection point between the first light receiving unit and the second light receiving unit, and the difference between the received light intensity in the first light receiving unit and the received light intensity in the second light receiving unit may be easily output.

The optical position detection device according to the aspect of the invention may be used for various apparatuses with position detection function having a visual surface component member with a visual surface. The visual surface component member may employ a configuration as a direct-view-type image generation device that displays an image. And in this case, the visual surface is an image display surface on which the image is displayed in the direct-view-type image generation device. According to the configuration, the apparatus with position detection function may be formed as a direct-view-type display apparatus with position detection function. Further, the visual surface component member may employ a screen on which information is visually recognized. And in this case, the visual surface is a screen surface on which the information is visually recognized in the screen. According to the configuration, the apparatus with position detection function may be formed as a screen apparatus with position detection function. Further, the visual surface component member may employ a light-transmissive member that covers an exhibit. And in this case, the visual surface is a surface on which the exhibit is visually recognized at the opposite side to the side at which the exhibit is placed in the visual surface component member. According to the configuration, the apparatus with position detection function may be formed as a show window with position detection function or the like. Furthermore, the visual surface component member may employ a configuration having a base that supports a moving gaming medium. And in this case, the visual surface is a surface on which the gaming medium is visually recognized in the base. According to the configuration, the apparatus with position detection function may be formed as an amusement machine such as a Japanese pinball machine or a coin game.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
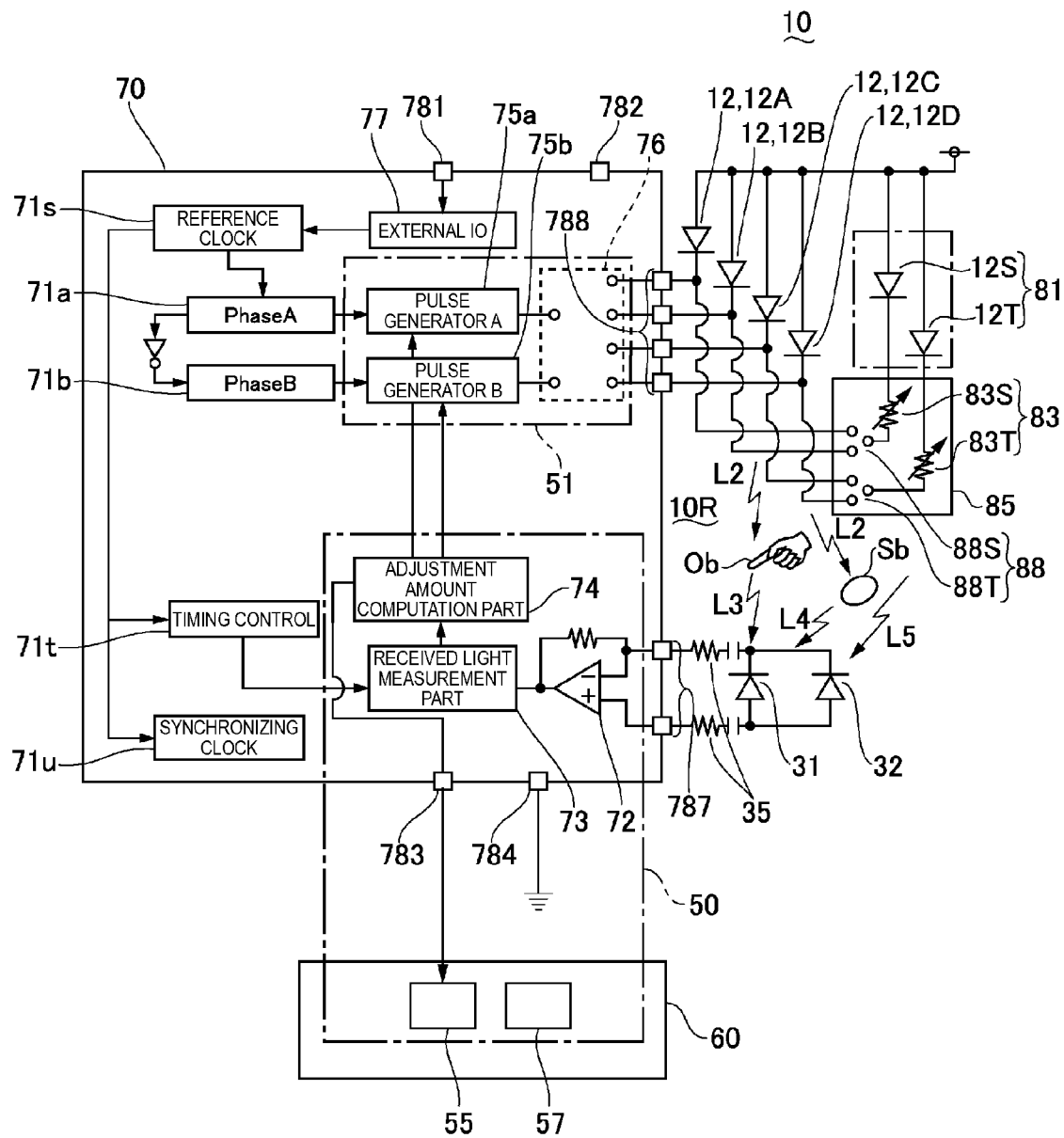
FIG. 1 is an explanatory diagram schematically showing an overall configuration of an optical position detection device according to a first embodiment of the invention.

Next, embodiments of the invention will be explained in detail with reference to the accompanying drawings. In the following explanation, axes crossing one another will be referred to as an X-axis and a Y-axis; an axis crossing the X-axis and the Y-axis will be referred to as a Z-axis; and the output direction of detection light is the Z-axis direction. Further, in the drawings referred to as below, one side in the X-axis direction will be shown as an X1-side, the other side will be shown as an X2-side; one side in the Y-axis direction will be shown as a Y1-side, the other side will be shown as a Y2-side; and one side in the Z-axis direction will be shown as a Z1-side, the other side will be shown as a Z2-side.

First Embodiment

Overall Configuration

FIG. 1 is an explanatory diagram schematically showing an overall configuration of an optical position detection device according to a first embodiment of the invention.

In FIG. 1, an optical position detection device 10 of the first embodiment is a device that optically detects a position of a target object Ob. And the optical position detection device 10 has plural detection light sources 12 that output detection light L2, a light source drive unit 51 that drives the plural detection light sources 12, a first light receiving unit 31 that receives detection light L3 reflected by the target object located in an output space of the detection light L2 (detection target space 10R), and a position detection unit 50 that detects the position of the target object Ob based on a detection result in the first light receiving unit 31. Three or more light sources are used as the plural detection light sources 12. And in the embodiment, the number of the detection light sources 12 is four. More specifically, the optical position detection device 10 include detection light sources 12A, 12B, 12C, 12D as the four detection light sources, and the output space of the detection light L2 from these detection light sources 12 forms the detection target space 10R in which the position of the target object Ob is detected.

Any of the detection light sources 12 (detection light sources 12A, 12B, 12C, 12D) includes a light emitting device such as an LED (light emitting diode). And any of the detection light sources 12 outputs the detection light L2 of infrared light having a peak wavelength from 840 to 1000 nm as diverging light. In this embodiment, the target object Ob is often a fingertip. And infrared light (near-infrared light of about 840 to 920 nm) in a wavelength range at a high reflectance on the target object Ob (human body) is used as the detection light L2.

The first light receiving unit 31 includes a photoelectric conversion element such as a photodiode or phototransistor with its light receiving surface directed toward the detection target space 10R. And in this embodiment, the first light receiving unit 31 is a photodiode having a sensitivity peak in the infrared range.

Further, in the embodiment, though details will be described later, if another object Sb than the target object Ob exists in the detection target space 10R, the detection light L4 reflected by the object Sb enters the first light receiving unit 31 as unnecessary light. And the position detection accuracy of the target object Ob becomes lower. Accordingly, a compensation light source unit 81 outputting compensation light L5 that does not enter the detection target space 10R is provided in the optical position detection device 10. And in the embodiment, the compensation light source unit 81 includes a first compensation light source 12S and a second compensation light source 12T. The first compensation light source 12S and the second compensation light source 12T are LEDs that output infrared light in the same wavelength range as that of the detection light sources 12. Further, in the embodiment, a second light receiving unit 32 does not receive the detection light L3 reflected by the target object Ob, the detection light L4 reflected by the other object Sb than the target object Ob, or the ambient light such as outdoor light. But the second light receiving unit 32 receives compensation light L5 output from the compensation light source unit 81 (the first compensation light source 12S and the second compensation light source 12T). In the embodiment, the second light receiving unit 32 includes a photodiode having a sensitive peak in the infrared range like the first light receiving unit 31.

In the optical position detection device 10 having the above configuration according to the first embodiment, the light source drive unit 51 and parts having a partial function of the position detection unit 50 are formed as a control IC 70. The control IC 70 includes a reference clock generator 71s that generates a reference clock, an A-phase reference pulse generator 71a that generates an A-phase reference pulse based on the reference clock, a B-phase reference pulse generator 71b that generates a B-phase reference pulse based on the reference clock, a timing control pulse generator 71t that generates a timing control pulse, and a synchronizing clock generator 71u that generates a synchronizing clock.

Further, the control IC 70 has a pulse generator 75a that generates a predetermined drive pulse based on the A-phase reference pulse, a pulse generator 75b that generates a predetermined drive pulse based on the B-phase reference pulse, and a switch part 76 that controls application of the drive pulses generated by the pulse generators 75a, 75b to the detection light sources of the four detection light sources 12, and the pulse generators 75a, 75b and the switch part 76 form the light source drive unit 51.

Furthermore, the control IC 70 includes a differential amplifier 72 that amplifies the detection results in the first light receiving unit 31 and the second light receiving unit 32, a received light measurement part 73 that measures an amount of received light based on the signal output from the differential amplifier 72, and an adjustment amount computation part 74 that controls the pulse generators 75a, 75b based on the measurement results in the received light measurement part 73 and adjusts current levels of the drive pulses supplied to the detection light sources 12, and the differential amplifier 72, the received light measurement part 73, and the adjustment amount computation part 74 have a partial function of the position detection unit 50. More specifically, the control IC 70 is controlled by a superior control unit 60 such as a personal computer. And the control unit 60 has a coordinate acquisition part 55 forming the position detection unit 50 together with the differential amplifier 72, the received light measurement part 73, and the adjustment amount computation part 74. Therefore, in the embodiment, the position detection unit 50 includes the differential amplifier 72, the received light measurement part 73, and the adjustment amount computation part 74 of the control IC 70 and the coordinate acquisition part 55 of the superior control unit 60 (personal computer).

Note that the control IC 70 includes a terminal 781 that receives a command from the superior control unit 60 and an external IO 77, and includes plural terminals 782 to 784, 787, 788. Therefore, the control IC 70 can drive the detection light sources 12 via the terminal 788. The detection results in the first light receiving unit 31 and the second light receiving unit 32 are input via the terminal 787 to the control IC 70. Further, a drive potential and the ground potential are input via the terminals 782, 784 to the control IC 70. Furthermore, the control IC 70 can output an adjustment result in the adjustment amount computation part 74 via the terminal 783 to the superior control unit 60.

Layout of Detection Light Sources and Others

Figure 2A:
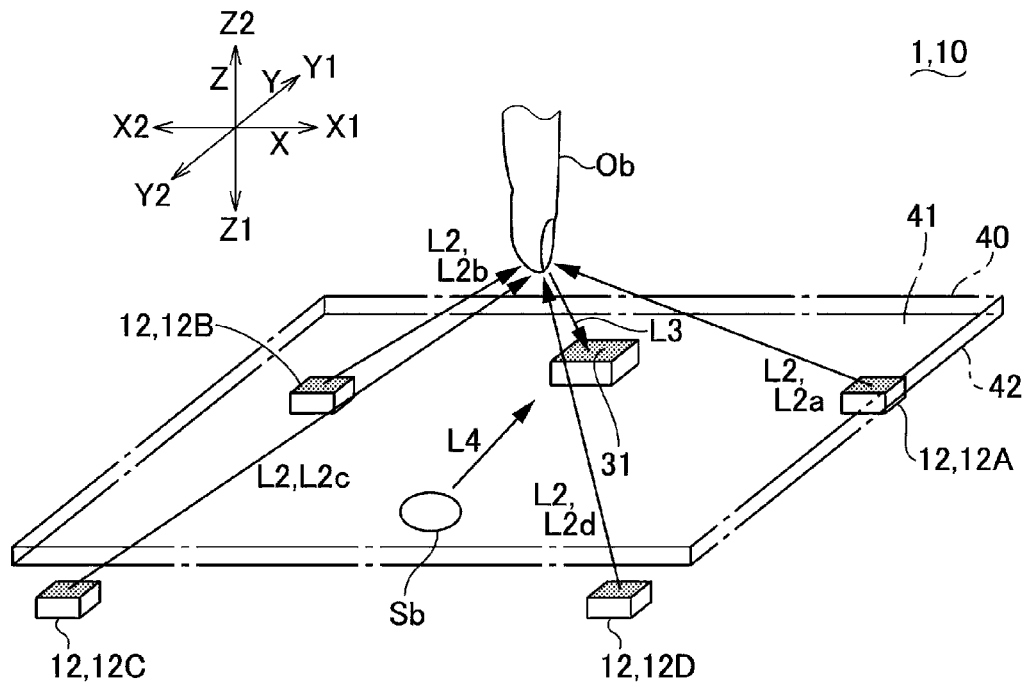
FIGS. 2A and 2B are explanatory diagrams showing a layout of detection light sources in an optical position detection device according to a first embodiment of the invention.
Figure 2B:
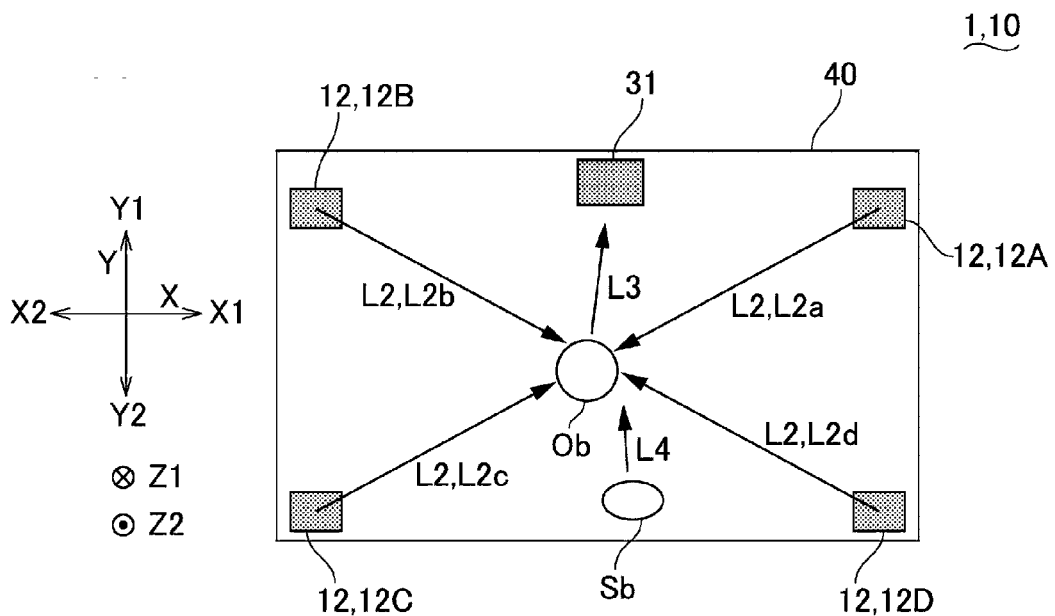

FIGS. 2A and 2B are explanatory diagrams showing a layout of the detection light sources 12 in the optical position detection device 10 according to the first embodiment of the invention. FIG. 2A is an explanatory diagram showing a stereoscopic layout of the detection light sources FIG. 2B is an explanatory diagram showing a planar layout of the detection light sources FIG. 3 is an explanatory diagram of the detection light sources in the optical position detection device according to the first embodiment of the invention seen from the side.

Figure 3:
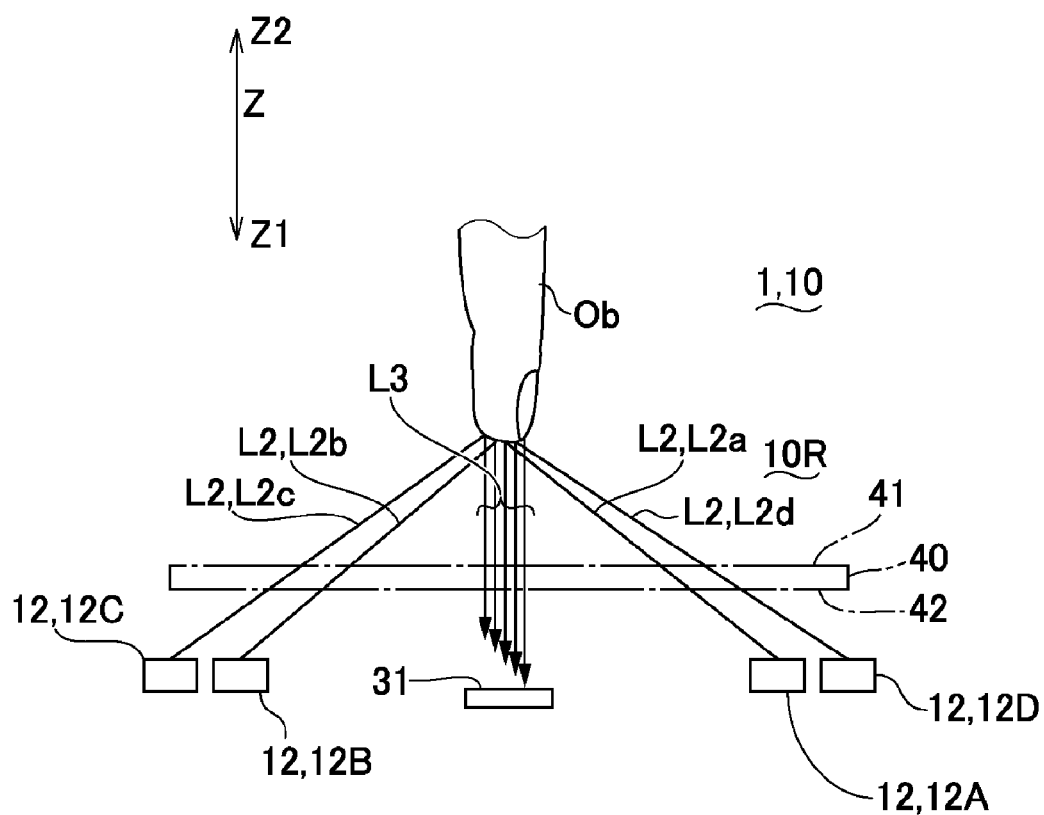
FIG. 3 is an explanatory diagram of a detection light sources in an optical position detection device according to a first embodiment of the invention seen from the side.

As shown in FIGS. 2A, 2B, and 3, the optical position detection device 10 is used for forming an apparatus 1 with a position detection function such as a display apparatus with position detection device, which will be described later, together with a light-transmissive visual surface component member 40 having a visual surface 41. In the apparatus 1 with the position detection function, the entire space at the visual surface 41 side (the other side Z2 in the Z-axis direction) with respect to the visual surface component member 40 is the detection target space 10R of the optical position detection device 10.

The visual surface component member 40 includes a sheet-like or plate-like light-transmissive member provided with the detection light sources 12 and the first light receiving unit 31 at one side Z1 in the Z-axis direction. Further, any of the detection light sources 12 has a light emitting part directed toward the visual surface component member 40. The first light receiving unit 31 has a light receiving surface directed toward the visual surface component member 40. Accordingly, the detection light sources 12 (the detection light sources 12A, 12B, 12C, 12D) output detection light L2 (detection light L2a, L2b, L2c, L2d) from a rear surface 42 side opposite to the visual surface 41 side toward the visual surface 41 side. The first light receiving unit 31 detects the detection light L3 reflected by the target object Ob and transmitted to the rear surface 42 side of the visual surface component member 40. Note that the visual surface component member 40 may be omitted depending on the type of the apparatus 1 with the position detection function.

In the embodiment, when seen from the detection target space 10R (Z-axis direction), the detection light source 12A and the detection light source 12B are not aligned in the X-axis direction and nearly in the same position in the Y-axis direction. The detection light source 12C and the detection light source 12D are not aligned in the X-axis direction and nearly in the same position in the Y-axis direction. The detection light source 12A and the detection light source 12D are not aligned in the Y-axis direction and nearly in the same position in the X-axis direction. The detection light source 12B and the detection light source 12C are not aligned in the Y-axis direction and nearly in the same position in the X-axis direction.

Basic Principle of Coordinate Detection

FIGS. 4A to 4E are timing charts showing operations in the optical position detection device 10 according to the first embodiment of the invention. With reference to FIGS. 1 to 4E, the basic principle of detecting the position of the target object Ob located in the detection target space 10R in the optical position detection device 10 will be explained. Then, an operation of compensation using the compensation light source unit 81 and the second light receiving unit 32 will be explained.

First, in the optical position detection device 10, the position detection unit 50 obtains a ratio of a distance between one detection light source 12 of the two detection light sources 12 and the target object Ob and a distance between the other detection light source 12 and the target object Ob from differential driving of the detection light sources 12, and detects the position of the target object Ob based on an equal ratio line set with reference to the two detection light sources 12 in response to the ratio.

Figure 4A:
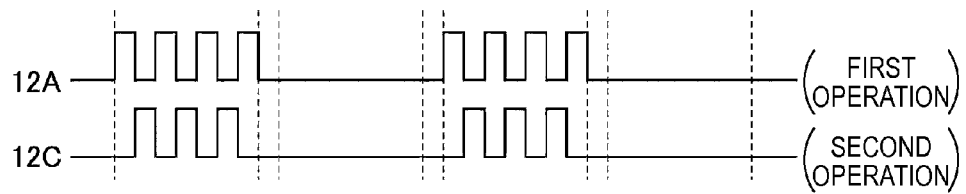
FIGS. 4A to 4E are timing charts showing operations in an optical position detection device according to a first embodiment of the invention.

More specifically, as shown in FIG. 4A, the light source drive unit 51 intermittently supplies A-phase drive pulses only to the detection light source 12A of the four detection light sources 12 as a first operation and intermittently supplies B-phase drive pulses at the opposite phase to the A-phase only to the detection light source 12B as a second operation in a first coordinate information detection period tx. Accordingly, in the first coordinate information detection period tx, the first operation by which the detection light source 12A turns on and the detection light L2a is output to the detection target space 10R and the second operation by which the detection light source 12C turns on and the detection light L2c is output to the detection target space 10R are alternately executed. As a result, as shown in FIG. 4C, the received light intensity in the first light receiving unit 31 alternately changes to detection intensity corresponding to the amount of light of the detection light L2a output from the detection light source 12A in the first operation, reflected by the target object Ob, and entering the first light receiving unit 31 and detection intensity corresponding to the amount of light of the detection light L2c output from the detection light source 12C in the second operation, reflected by the target object Ob, and entering the first light receiving unit 31. Here, the received light intensity in the first light receiving unit 31 at the first operation takes a value corresponding to the position relationship between the detection light source 12A and the target object Ob, and the received light intensity in the first light receiving unit 31 at the second operation takes a value corresponding to the position relationship between the detection light source 12C and the target object Ob.

In the embodiment, the adjustment amount computation part 74 of the position detection unit 50 adjusts a drive current (a control amount) for the detection light source 12A and a drive current (a control amount) for the detection light source 12C so that the received light intensity of the first light receiving unit 31 at the first operation and the received light intensity of the first light receiving unit 31 at the second operation obtained via the differential amplifier 72 and the received light measurement part 73 may be equal. For example, the light source drive unit 51 supplies equal drive currents to the detection light source 12A and the detection light source 12C at the start of detection. And if the received light intensity of the first light receiving unit 31 at the first operation and the received light intensity of the first light receiving unit 31 at the second operation are different, respectively adjusts the drive currents to the detection light sources 12A, 12C so that the received light intensity of the first light receiving unit 31 at the first operation and the received light intensity of the first light receiving unit 31 at the second operation may be equal. In the differential driving, a ratio of the drive currents, or a ratio of the amounts of adjustment of the drive currents, after the respective adjustment of the drive currents to the detection light sources 12A, 12C takes a value corresponding to the position of the target object Ob relative to the detection light sources 12A, 12C. Thus, the coordinate acquisition part 55 of the position detection unit 50 may set the equal ratio line with reference to the detection light sources 12A, 12C within the XY plane. And the target object Ob is located on the equal ratio line.

Figure 4B:
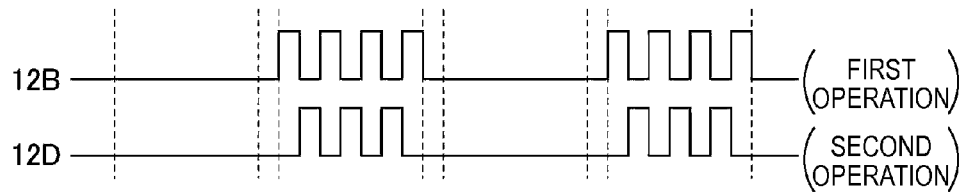
Figure 4C:
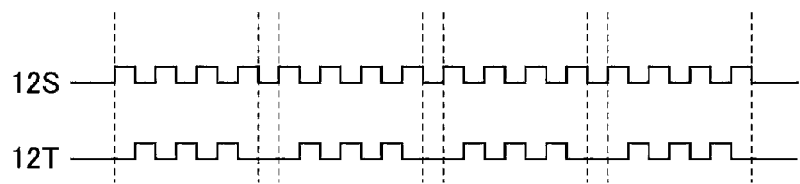

In the embodiment, in a second coordinate information detection period ty shown in FIG. 4B, in the nearly similar manner as in the first coordinate information detection period tx, the light source drive unit 51 intermittently supplies A-phase drive pulses only to the detection light source 12B of the four detection light sources 12 as a first operation and intermittently supplies B-phase drive pulses at the opposite phase to the A-phase only to the detection light source 12D as a second operation. Accordingly, in the second coordinate information detection period ty, the first operation by which the detection light source 12B turns on and the detection light L2b is output to the detection target space 10R and the second operation by which the detection light source 12D turns on and the detection light L2d is output to the detection target space 10R are alternately executed. As a result, as shown in FIG. 4C, the received light intensity in the first light receiving unit 31 alternately changes to detection intensity corresponding to the amount of light of the detection light L2b output from the detection light source 12B in the first operation, reflected by the target object Ob, and entering the first light receiving unit 31 and detection intensity corresponding to the amount of light of the detection light L2d output from the detection light source 12D in the second operation, reflected by the target object Ob, and entering the first light receiving unit 31. Here, the received light intensity in the first light receiving unit 31 at the first operation takes a value corresponding to the position relationship between the detection light source 12B and the target object Ob, and the received light intensity in the first light receiving unit 31 at the second operation takes a value corresponding to the position relationship between the detection light source 12D and the target object Ob.

Further, in the embodiment, also, in the second coordinate information detection period ty, in the nearly similar manner as in the first coordinate information detection period tx, the adjustment amount computation part 74 of the position detection unit 50 adjusts a drive current (a control amount) for the detection light source 12B and a drive current (a control amount) for the detection light source 12D so that the received light intensity of the first light receiving unit 31 at the first operation and the received light intensity of the first light receiving unit 31 at the second operation obtained via the differential amplifier 72 and the received light measurement part 73 may be equal. For example, the light source drive unit 51 supplies equal drive currents to the detection light source 12B and the detection light source 12D at the start of detection. If the received light intensity of the first light receiving unit 31 at the first operation and the received light intensity of the first light receiving unit 31 at the second operation are different, respectively adjusts the drive currents to the detection light sources 12B, 12D so that the received light intensity of the first light receiving unit 31 at the first operation and the received light intensity of the first light receiving unit 31 at the second operation may be equal. In the differential driving, a ratio of the drive currents, or a ratio of the amounts of adjustment of the drive currents, after the respective adjustment of the drive currents to the detection light sources 12B, 12D takes a value corresponding to the position of the target object Ob relative to the detection light sources 12B, 12D. Thus, the coordinate acquisition part 55 of the position detection unit 50 may set the equal ratio line with reference to the detection light sources 12B, 12D within the XY plane. And the target object Ob is located on the equal ratio line.

Therefore, the position detection unit 50 may obtain the position (XY coordinates) of the target object Ob from a position corresponding to the intersection of the equal ratio line obtained from the differential driving of the detection light source 12A and the detection light source 12C in the first coordinate information detection period tx and the equal ratio line obtained from the differential driving of the detection light source 12B and the detection light source 12D in the second coordinate information detection period ty.

The above described equal ratio lines may be obtained in the following manner by focusing attention on a distance function of the detection light L2 output from the detection light sources 12, reflected by the target object Ob, and reaching the first light receiving unit 31. First, respective parameters are given as follows.

T=reflectance of target object Ob $A_t$=distance function of detection light L2a output from detection light source 12A, reflected by target object Ob, and reaching first light receiving unit 31

A=detection intensity of first light receiving unit 31 when detection light source 12A turns on with target object Ob existing in detection target space 10R $C_t$=distance function of detection light L2c output from detection light source 12C, reflected by target object Ob, and reaching first light receiving unit 31

C=detection intensity of first light receiving unit 31 when detection light source 12C turns on with target object Ob existing in detection target space 10R Note that the light emission intensity of the detection light source 12A and the detection light source 12C is expressed by a product of the drive current and the emission coefficient. The emission coefficient is "1" in the following explanation. Further, in the above described differential driving, when the received light intensity in the first light receiving unit 31 is equal, the drive current for the detection light source 12A is $I_A$ and the drive current for the detection light source 12C is $I_C$.

The above described differential driving is performed with the target object Ob existing in the detection target space 10R, the following relationships are obtained.

$$A = T \times A_t \times I_A + \text{ambient light} \qquad \text{Eq. (1)}$$

$$C = T \times C_t \times I_C + \text{ambient light} \qquad \text{Eq. (2)}$$

Here, since the detection intensity of the first light receiving unit 31 at differential driving is equal, the following equations are derived from the equations (1), (2).

$$T \times A_t \times I_A + \text{ambient light} = T \times C_t \times I_C + \text{ambient light} T \times A_t \times I_A = T \times C_t \times I_C \qquad \text{Eq. (3)}$$

Further, the ratio $P_{AC}$ of the distance functions $A_t$ and $C_t$ is defined by the following equation.

$$P_{AC} = A_t / C_t \qquad \text{Eq. (4)}$$

Accordingly, the ratio $P_{AC}$ of the distance functions is expressed by the following equation from the equations (3), (4).

$$P_{AC} = I_C / I_A \qquad \text{Eq. (5)}$$

In the equation (5), there is no term of the ambient light. Further, regardless of the part of the target object Ob, if the reflectance is constant, there is no term of the reflectance of the target object Ob. Thus, the ambient light and the reflectance of the target object Ob do not affect the ratio $P_{AC}$ of the distance functions $A_t$ and $C_t$. Note that, regarding the mathematical model, correction for cancelling out the influence of the detection light L2 not reflected by the target object Ob but entering may be performed.

Here, because the detection light sources 12 are point light sources, the light intensity at a certain point is inversely proportional to the square of the distances from the light sources. Therefore, a ratio between a separation distance P1 from the detection light source 12A through the target object Ob to the first light receiving unit 31 and a separation distance P2 from the detection light source 12C through the target object Ob to the first light receiving unit 31 is obtained by the following equation.

$$P_{AC} = (P1)^2 : (P2)^2$$

Thus, an equal ratio line corresponding to the ratio P1:P2 may be set with reference to the detection light source 12A and the detection light source 12C within the XY plane. And the target object Ob is located on the equal ratio line.

Concurrently, by differentially driving the detection light source 12B and the detection light source 12D and by obtaining a ratio of a distance between the detection light source 12B and the target object Ob and a distance between the detection light source 12D and the target object Ob, an equal ratio line may be set with reference to the detection light source 12B and the detection light source 12D within the XY plane. And the target object Ob is located on the equal ratio line.

Thus, the position detection unit 50 may obtain the position (XY coordinates) of the target object Ob by obtaining the intersection of the following two equal ratio lines; the equal ratio line obtained by the differential driving of the detection light source 12A and the detection light source 12C and the equal ratio line obtained by the differential driving of the detection light source 12B and the detection light source 12D. According to the configuration, since the differential driving of the detection light sources 12 is used, the influences of the ambient light may be automatically corrected.

Configuration of Compensation Light Source Unit 81 and Others

In the optical position detection device 10, as shown in FIGS. 1, 2A, and 2B, if the other object Sb than the target object Ob exists in the detection target space 10R, the detection light L4 reflected by the object Sb enters the first light receiving unit 31 as unnecessary light. Therefore, as shown in FIG. 4C, in the first coordinate information detection period tx, the received light intensity in the first light receiving unit 31 contains received light intensity P3 of the detection light L3 reflected by the target object Ob and received light intensity P4 of the detection light L4 (gray region) reflected by the object Sb. Further, similarly, in the second coordinate information detection period ty, the received light intensity in the first light receiving unit 31 contains received light intensity of the detection light L3 reflected by the target object Ob and received light intensity of the detection light L4 (gray region) reflected by the object Sb.

Accordingly, as shown in FIG. 1, in the optical position detection device 10, the compensation light source unit 81 (the first compensation light source 12S and the second compensation light source 12T) outputting the compensation light L5 that does not enter the detection target space 10R and the second light receiving unit 32 that does not receive the detection light L3 reflected by the target object or the detection light L4 reflected by the other object Sb than the target object Ob, but receives the compensation light L5 are provided. The configuration may be realized by a configuration in which the compensation light source unit 81 (the first compensation light source 12S and the second compensation light source 12T) and the second light receiving unit 32 are provided in positions isolated using a light-shielding member from the detection target space 10R.

Further, a compensation light source control unit 85 is provided for the compensation light source unit 81. And the level of the drive current to be supplied to the compensation light source unit 81 is controlled by the compensation light source unit 81. In the embodiment, the compensation light source control unit 85 is provided outside of the control IC 70. Here, the compensation light source control unit 85 includes a compensation drive current setting unit 83 that sets the level of the drive current to be supplied to the compensation light source unit 81 and a lighting pattern control part 88 for lighting the first compensation light source 12S and the second compensation light source 12T in response to the lighting pattern in the detection light sources 12.

The compensation drive current setting unit 83 includes a first compensation drive current setting unit 83S that sets the drive current for compensation to be supplied to the first compensation light source 12S and a second compensation drive current setting unit 83T that sets the drive current for compensation to be supplied to the second compensation light source 12T. And the first compensation drive current setting unit 83S and the second compensation drive current setting unit 83T function as variable resistors for which resistance values are set by a compensation condition setting part 57 provided in the superior control unit 60. Therefore, the compensation light source unit 81 (the first compensation light source 12S and the second compensation light source 12T) variably changes the output intensity of the compensation light L5.

Further, the lighting pattern control part 88 includes switches 88S, 88T. And the lighting pattern control unit 88 in the first coordinate information detection period tx turns on the first compensation light source 12S and the second compensation light source 12T in synchronization with the detection light sources 12A, 12C. The lighting pattern control part 88 in the second coordinate information detection period ty turns on the first compensation light source 12S and the second compensation light source 12T in synchronization with the detection light sources 12B, 12D. More specifically, the switches 88S, 88T bring a feeding line for the detection light source 12A into conduction to the first compensation light source 12S via the first compensation drive current setting unit 83S and a feeding line for the detection light source 12C into conduction to the second compensation light source 12T via the second compensation drive current setting unit 83T in the first coordinate information detection period tx. Therefore, as shown in FIGS. 4A, 4B, when the detection light source 12A turns on at the first operation in the first coordinate information detection period tx, the current set by the first compensation drive current setting unit 83S is supplied to the first compensation light source 12S, and the detection light source 12A and the first compensation light source 12S turn on at the same time. Further, when the detection light source 12C turns on at the second operation in the first coordinate information detection period tx, the current set by the second compensation drive current setting unit 83T is supplied to the second compensation light source 12T. And the detection light source 12C and the second compensation light source 12T turn on at the same time.

Furthermore, in the lighting pattern control part 88, the switches 88S, 88T bring a feeding line for the detection light source 12B into conduction to the first compensation light source 12S via the first compensation drive current setting unit 83S and a feeding line for the detection light source 12D into conduction to the second compensation light source 12T via the second compensation drive current setting unit 83T in the second coordinate information detection period ty. Therefore, as shown in FIGS. 4A, 4B, when the detection light source 12B turns on at the first operation in the second coordinate information detection period ty, the current set by the first compensation drive current setting unit 83S is supplied to the first compensation light source 12S. And the detection light source 12B and the first compensation light source 12S turns on at the same time. Further, when the detection light source 12D turns on at the second operation in the second coordinate information detection period ty, the current set by the second compensation drive current setting unit 83T is supplied to the second compensation light source 12T. And the detection light source 12D and the second compensation light source 12T turn on at the same time.

Figure 4D:
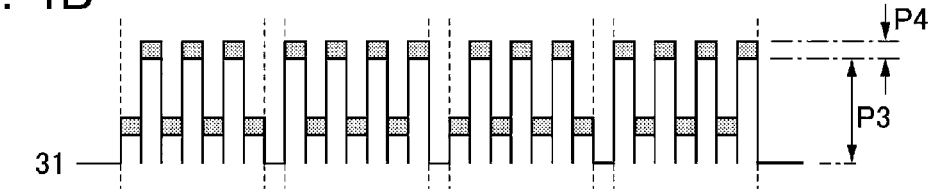

Thus, as shown in FIG. 4D, the second light receiving unit 32 receives first compensation light output from the first compensation light source 12S at the first operation in the first coordinate information detection period tx and receives second compensation light output from second compensation light source 12T at the second operation in the first coordinate information detection period tx. Further, the second light receiving unit 32 receives first compensation light output from the first compensation light source 12S at the first operation and receives second compensation light output from the second compensation light source 12T at the second operation in the second coordinate information detection period ty.

Configuration of Second Light Receiving Unit 32 and Others

In FIG. 1 again, in the optical position detection device 10, both the first light receiving unit 31 and the second light receiving unit 32 are photodiodes (photoelectric conversion elements). And the first light receiving unit 31 and the second light receiving unit 32 are electrically connected in parallel with opposite polarities. Further, two connection points between the first light receiving unit 31 and the second light receiving unit 32 are electrically connected to the differential amplifier 72 of the position detection unit 50. That is, the connection point between the anode of the first light receiving unit 31 and the cathode of the second light receiving unit 32 is electrically connected to one input terminal of the differential amplifier 72. The connection point between the cathode of the first light receiving unit 31 and the anode of the second light receiving unit 32 is electrically connected to the differential amplifier 72. Accordingly, the difference between the detection intensity in the first light receiving unit 31 and the detection intensity in the second light receiving unit 32 is input to the differential amplifier 72.

Figure 4E:
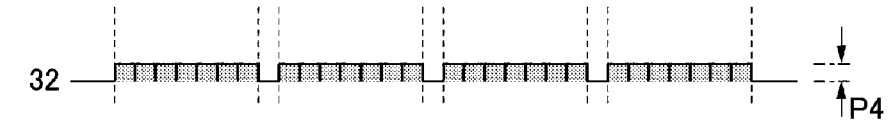

Accordingly, when the position of the target object Ob is detected on the principle, the received light measurement part 73 of the position detection unit 50 detects the difference between the received light intensity in the first light receiving unit 31 and the received light intensity in the second light receiving unit 32 as an amount of received light as shown in FIG. 4E. Therefore, the adjustment amount computation part 74 of the position detection unit 50 respectively adjusts the amounts of control (drive currents) for the detection light sources 12A, 12C so that the difference between the received light intensity in the first light receiving unit 31 and the received light intensity in the second light receiving unit 32 may be equal at the first operation and the second operation in the first coordinate information detection period tx. Further, the adjustment amount computation part 74 respectively adjusts the amounts of control (drive currents) to the detection light sources 12B, 12D so that the differences between the received light intensity in the first light receiving unit 31 and the received light intensity in the second light receiving unit 32 may be equal at the first operation and the second operation in the second coordinate information detection period ty. Thus, the coordinate acquisition part 55 of the position detection unit 50 obtains an equal ratio line based on results of the respective adjustments of the amounts of control (drive currents) for the detection light sources 12A, 12C so that the differences between the received light intensity in the first light receiving unit 31 and the received light intensity in the second light receiving unit 32 may be equal at the first operation and the second operation in the first coordinate information detection period tx. Further, the coordinate acquisition part 55 obtains an equal ratio line based on results of the respective adjustments of the amounts of control (drive currents) for the detection light sources 12B, 12D so that the difference between the received light intensity in the first light receiving unit 31 and the received light intensity in the second light receiving unit 32 may be equal at the first operation and the second operation in the second coordinate information detection period ty. Then, the coordinate acquisition part 55 specifies the position corresponding to the intersection of the equal ratio line obtained in the first coordinate information detection period tx and the equal ratio line obtained in the second coordinate information detection period ty as the position of the target object Ob.

Note that a capacitor and a high-pass filter 35 using a resistor are inserted between the connection point between the first light receiving unit 31 and the second light receiving unit 32 and the differential amplifier 72. Accordingly, a high-frequency signal is input to the differential amplifier 72. And low-frequency signals caused by the ambient light such as outdoor light are removed. Therefore, when the position of the target object Ob is detected, the influence of the ambient light such as outdoor light may be eliminated.

Compensation Operation by Compensation Light Source Unit 81 and Second Light Receiving Unit 32

In the optical position detection device 10, before the operation explained with reference to FIGS. 4A to 4E is started, or, in the middle of the repetition of the operation explained with reference to FIGS. 4A to 4E, the following operation is executed under the control of the control unit 60 with no target object Ob existing in the detection target space 10R.

First, the light source drive unit 51 sequentially supplies drive pulses as reference to the detection light sources 12A, 12B, 12C, 12D to sequentially turn on the detection light sources 12A, 12B, 12C, 12D. Meanwhile, the compensation light source control unit 85 stops feeding to the compensation light source unit 81 (the first compensation light source 12S and the second compensation light source 12T). Therefore, when the detection light source 12A is turned on, the received light intensity of the first light receiving unit 31 is received light intensity of the detection light L2a reflected by the other object Sb than the target object Ob. And its result is temporarily stored in the compensation condition setting part 57 provided in the superior control unit 60. Then, when the detection light source 12B is turned on, the received light intensity of the first light receiving unit 31 is received light intensity of the detection light L2b reflected by the other object Sb than the target object Ob. And its result is temporarily stored in the compensation condition setting part 57 provided in the superior control unit 60. Then, when the detection light source 12C is turned on, the received light intensity of the first light receiving unit 31 is received light intensity of the detection light L2c reflected by the other object Sb than the target object Ob. And its result is temporarily stored in the compensation condition setting part 57 provided in the superior control unit 60. Then, when the detection light source 12D is turned on, the received light intensity of the first light receiving unit 31 is received light intensity of the detection light L2d reflected by the other object Sb than the target object Ob. And its result is temporarily stored in the compensation condition setting part 57 provided in the superior control unit 60.

Before the detection operation explained with reference to FIGS. 4A to 4E, the compensation condition setting part 57 instructs the compensation drive current setting unit 83 for drive current values to be supplied to the compensation light source unit 81 (the first compensation light source 12S and the second compensation light source 12T) when the detection light sources 12A, 12B, 12C, 12D are respectively turned on. As a result, in the compensation drive current setting unit 83, a ratio between the drive current supplied to the detection light source 12 that outputs the detection light L2 at the first operation and the drive current supplied to the first compensation light source 12S is set in the first compensation drive current setting unit 83S. And a ratio between the drive current supplied to the detection light source 12 that outputs the detection light L2 at the second operation and the drive current supplied to the second compensation light source 12T is set in the second compensation drive current setting unit 83T.

Here, the ratios set in the first compensation drive current setting unit 83S and the second compensation drive current setting unit 83T are values that define the output intensity of the compensation light L5 output from the compensation light source unit 81 (the first compensation light source 12S and the second compensation light source 12T) so that the received light intensity of the detection light L4 reflected by the other object Sb than the target object Ob in the first light receiving unit 31 and the received light intensity of the compensation light L5 in the second light receiving unit 32 may be equal when the detection light sources 12A, 12B, 12C, 12D are sequentially turned on. Thus, the received light measurement part 73 measures a true value (the received light intensity of the detection light L3 reflected by the target object Ob) obtained by eliminating the received light intensity of the detection light L4 reflected by the other object Sb than the target object Ob.

More specifically, at the first operation in the first coordinate information detection period tx, in the first compensation drive current setting unit 83S, when the detection light source 12A turns on, the value (ratio) that defines the output intensity of the compensation light L5 output from the first compensation light source 12S is set so that the received light intensity in the first light receiving unit 31 of the detection light L4 reflected by the other object Sb than the target object Ob and the received light intensity of the compensation light L5 in the second light receiving unit 32 may be equal. In addition, at the first operation in the first coordinate information detection period tx, when the detection light source 12A turns on, the first compensation light source 12S also turns on. Therefore, the received light measurement part 73 measures a true value (the received light intensity of the detection light L3 reflected by the target object Ob) obtained by eliminating the received light intensity of the detection light L4 reflected by the other object Sb than the target object Ob.

Further, at the second operation in the first coordinate information detection period tx, in the second compensation drive current setting unit 83T, when the detection light source 12C turns on, the value (ratio) that defines the output intensity of the compensation light L5 output from the second compensation light source 12T is set so that the received light intensity in the first light receiving unit 31 of the detection light L4 reflected by the other object Sb than the target object Ob and the received light intensity of the compensation light L5 in the second light receiving unit 32 may be equal. In addition, at the second operation in the first coordinate information detection period tx, when the detection light source 12C turns on, the second compensation light source 12T also turns on. Therefore, the received light measurement part 73 measures a true value (the received light intensity of the detection light L3 reflected by the target object Ob) obtained by eliminating the received light intensity of the detection light L4 reflected by the other object Sb than the target object Ob.

Also, in the second coordinate information detection period ty, the operation is similarly performed to that in the first coordinate information detection period tx. That is, at the first operation in the second coordinate information detection period ty, in the first compensation drive current setting unit 83S, when the detection light source 12B turns on, the value (ratio) that defines the output intensity of the compensation light L5 output from the first compensation light source 12S is set so that the received light intensity in the first light receiving unit 31 of the detection light L4 reflected by the other object Sb than the target object Ob and the received light intensity of the compensation light L5 in the second light receiving unit 32 may be equal. In addition, at the first operation in the second coordinate information detection period ty, when the detection light source 12B turns on, the first compensation light source 12S also turns on. Therefore, the received light measurement part 73 measures a true value (the received light intensity of the detection light L3 reflected by the target object Ob) obtained by eliminating the received light intensity of the detection light L4 reflected by the other object Sb than the target object Ob. Further, at the second operation in the second coordinate information detection period ty, in the second compensation drive current setting unit 83T, when the detection light source 12D turns on, the value (ratio) that defines the output intensity of the compensation light L5 output from the second compensation light source 12T is set so that the received light intensity in the first light receiving unit 31 of the detection light L4 reflected by the other object Sb than the target object Ob and the received light intensity of the compensation light L5 in the second light receiving unit 32 may be equal. In addition, at the second operation in the second coordinate information detection period ty, when the detection light source 12D turns on, the second compensation light source 12T also turns on. Therefore, the received light measurement part 73 measures a true value (the received light intensity of the detection light L3 reflected by the target object Ob) obtained by eliminating the received light intensity of the detection light L4 reflected by the other object Sb than the target object Ob.

Furthermore, for the compensation operation, the light source drive unit 51 supplies power to the detection light sources 12 and supplies the drive current of the current value obtained by converting the drive currents supplied to the detection light sources 12 at the ratios set in the compensation drive current setting unit 83. Therefore, when the drive current values to be supplied to the detection light sources 12A, 12B, 12C, 12D change at the differential driving, the current values to be supplied to the first compensation light source 12S and the second compensation light source 12T automatically change in conjunction with the changes. Thus, the received light measurement part 73 constantly measures a true value (the received light intensity of the detection light L3 reflected by the target object Ob) obtained by eliminating the received light intensity of the detection light L4 reflected by the other object Sb than the target object Ob.

Main Advantages of Embodiment

As explained above, in the optical position detection device 10, the plural detection light sources 12 that output detection light L2 is used. And when the plural detection light sources 12 are sequentially turned on, the first light receiving unit 31 receives the detection light L3 reflected by the target object Ob. Therefore, if the detection result in the first light receiving unit 31 is directly used, or the drive condition of the drive current values when the detection light sources 12 are differentially driven based on the received light intensity in the first light receiving unit 31, the position of the target object Ob may be detected.

Here, in the first light receiving unit 31, in some cases, the detection light L4 reflected by the other object Sb than the target object Ob enters in addition to the detection light L3 reflected by the target object Ob. The compensation light source unit 81 outputting compensation light L5 that does not enter the detection target space 10R and the second light receiving unit 32 that does not receive the detection light L2, L3, L4, but receives the compensation light L5 are provided. Therefore, if the received light intensity of the compensation light L5 in the second light receiving unit 32 is set to the received light intensity in the first light receiving unit 31 of the detection light L4 reflected by the other object Sb than the target object Ob, and then, when the position of the target object Ob is detected based on the difference between the received light intensity in the first light receiving unit 31 and the received light intensity in the second light receiving unit 32 in the position detection unit 50, in its detection result, the influence of the detection light L4 reflected by the other object Sb than the target object Ob has been automatically removed. Thus, the position of the target object Ob may be detected without being affected by the detection light L4 reflected by the other object Sb than the target object Ob.

Further, in the embodiment, even when the light source drive unit 51 executes the first operation of allowing part of the plural detection light sources 12 to output the detection light L2 and the second operation of allowing the other part of the detection light sources 12 to output the detection light L2, the position detection unit 50 detects the position of the target object Ob based on the difference between the received light intensity in the first light receiving unit and the received light intensity in the second light receiving unit 32 at the first operation and the difference between the received light intensity in the first light receiving unit 31 and the received light intensity in the second light receiving unit 32 at the second operation. Therefore, even when the detection principle using the first operation and the second operation is employed, the position of the target object Ob may be detected without being affected by the detection light reflected by the other object Sb than the target object Ob.

Furthermore, in the embodiment, the output intensity of the compensation light L5 changes in conjunction with the output intensity of the detection light L2 output from the detection light sources 12 at the first operation in the first operation, and changes in conjunction with the output intensity of the detection light L2 output from the detection light sources 12 at the second operation in the second operation. Therefore, even when the detection principle of differentially driving the detection light sources 12 so that the difference between the received light intensity in the first light receiving unit 31 and the received light intensity in the second light receiving unit 32 at the first operation and the difference between the received light intensity in the first light receiving unit 31 and the received light intensity in the second light receiving unit 32 at the second operation may be equal is employed, the position of the target object Ob may be detected without being affected by the detection light reflected by the other object Sb than the target object Ob.

Further, in the embodiment, since the common light source drive unit 51 supplies power to the detection light sources 12 and the compensation light source unit 81, the circuit configuration may be simplified. Furthermore, since the detection light sources 12 and the compensation light source unit 81 are driven by the common light source drive unit 51, the output intensity of the compensation light L5 output from the compensation light source unit 81 may be easily changed in response to the changes of the drive currents supplied to the detection light sources 12 when the detection light sources 12 are differentially driven.

In addition, in the embodiment, the compensation drive current setting unit 83 respectively defines the ratio between the drive current supplied to the detection light sources 12 outputting the detection light L2 and the drive current supplied to the compensation light source unit 81 at the first operation and the ratio between the drive current supplied to the detection light sources 12 outputting the detection light L2 and the drive current supplied to the compensation light source unit 81 at the second operation. Accordingly, even when the amount of light of the detection light L2 output from the detection light sources 12, reflected by the other object Sb than the target object Ob, and entering the first light receiving unit 31 at the first operation and the amount of light of the detection light L2 output from the detection light sources 12, reflected by the other object Sb than the target object Ob, and entering the first light receiving unit 31 at the second operation are different, the influence of the detection light L4 reflected by the other object Sb than the target object Ob and entering the first light receiving unit 31 may be properly eliminated.

Further, since the compensation light source unit 81 includes the first compensation light source 12S that outputs the first compensation light as the compensation light L5 at the first operation and the second compensation light source 12T that outputs the second compensation light as the compensation light L5 at the second operation, the compensation light L5 having the proper intensity may be easily output at the first operation and the second operation.

Furthermore, since the first light receiving unit 31 is the photodiode (first photoelectric conversion element) and the second light receiving unit 32 is the photodiode (second photoelectric conversion element) electrically connected in parallel to the first light receiving unit 31 (photodiode/first photoelectric conversion element) with opposite polarity. Accordingly, the difference between the received light intensity in the first light receiving unit 31 and the received light intensity in the second light receiving unit 32 is output from the connection points between the first light receiving unit 31 and the second light receiving unit 32. And thus, the difference between the received light intensity in the first light receiving unit 31 and the received light intensity in the second light receiving unit 32 may be easily output.

In addition, in the embodiment, the compensation light source control unit 85 and the lighting pattern control part 88 are provided outside of the control IC 70. Accordingly, the configuration of the control IC 70 itself is the same between the cases in which the detection light L4 reflected by the other object Sb than the target object Ob and entering the first light receiving unit 31 is compensated and not compensated.

Therefore, there is an advantage that, even in the case in which the detection light L4 reflected by the object Sb and entering the first light receiving unit 31 is compensated, the control IC 70 used for the case in which the detection light L4 reflected by the object Sb and entering the first light receiving unit 31 is not compensated may be used without change. And the design change of the control IC 70 is not necessary.

Second Embodiment

Figure 5:
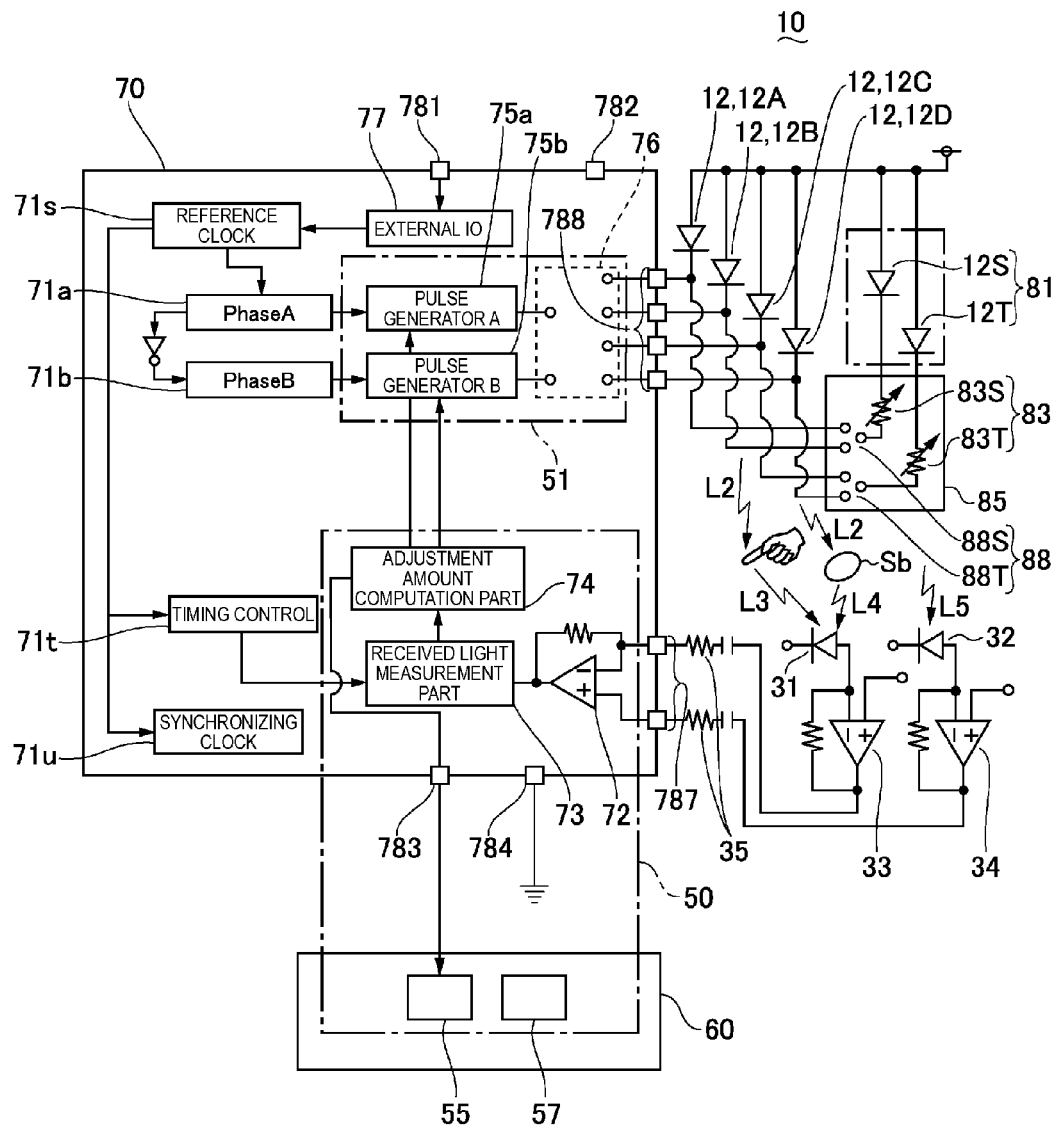
FIG. 5 is an explanatory diagram schematically showing an overall configuration of an optical position detection device according to a second embodiment of the invention.

FIG. 5 is an explanatory diagram schematically showing an overall configuration of an optical position detection device according to a second embodiment of the invention. Note that the basic configuration is nearly the same as that of the first embodiment. The same reference numerals are assigned to the common parts and their explanation will be omitted.

As shown in FIG. 5, similar to the first embodiment, an optical position detection device 10 has plural detection light sources 12 that output detection light L2, a light source drive unit 51 that drives the plural detection light sources 12, a first light receiving unit 31 that receives detection light L3 reflected by a target object located in an output space of the detection light L2 (detection target space 10R), and a position detection unit 50 that detects the position of the target object Ob based on a detection result in the first light receiving unit 31. Further, similar to the first embodiment, the optical position detection device 10 has a compensation light source unit 81 (a first compensation light source 12S and a second compensation light source 12T) outputting compensation light L5 that does not enter the detection target space 10R, and a second light receiving unit 32 that does not receive the detection light L3 reflected by the target object Ob or the detection light L4 reflected by the other object Sb than the target object Ob, but receives the compensation light L5 output from the compensation light source unit 81.

In the optical position detection device 10 having the configuration, in the first embodiment, photodiodes electrically connected in parallel with opposite polarities have been used as the first light receiving unit 31 and the second light receiving unit 32. However, amplifiers 33, 34 are provided in the first light receiving unit 31 and the second light receiving unit 32. And the amplifiers 33, 34 are electrically connected to a differential amplifier 72. That is, the amplifier 33 provided for the first light receiving unit 31 is electrically connected to one input terminal of the differential amplifier 72. The amplifier 34 provided for the second light receiving unit 32 is electrically connected to the other input terminal of the differential amplifier 72. The rest of the configuration is the same as that of the first embodiment, and the explanation will be omitted.

Thus, also, in the optical position detection device 10, similar to the first embodiment, the position detection unit 50 detects the position of the target object Ob based on the difference between received light intensity in the first light receiving unit 31 and received light intensity in the second light receiving unit 32. Therefore, the influence of the detection light L4 reflected by the other object Sb than the target object Ob may be removed. There is nearly the same advantage that the position of the target object Ob may be detected without being affected by the detection light L4 reflected by the other object Sb than the target object Ob.

Modified Example of First and Second Embodiments

Configuration Example Using Reference Light Source

Figure 6A:
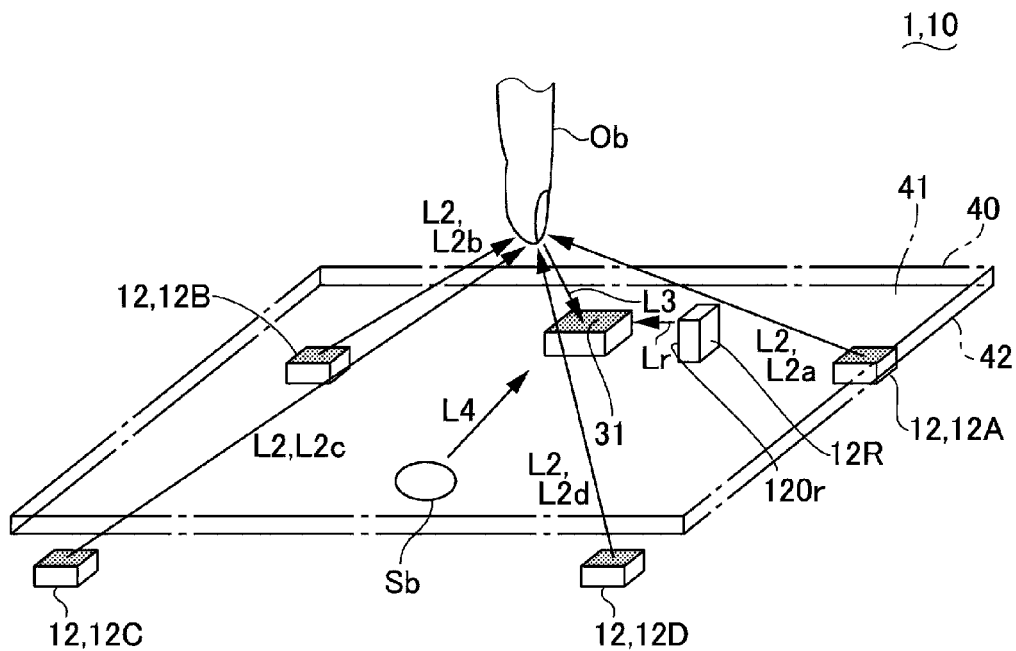
FIGS. 6A and 6B are explanatory diagrams showing a configuration example when a reference light source is used in an optical position detection device according to first and second embodiments of the invention.
Figure 6B:
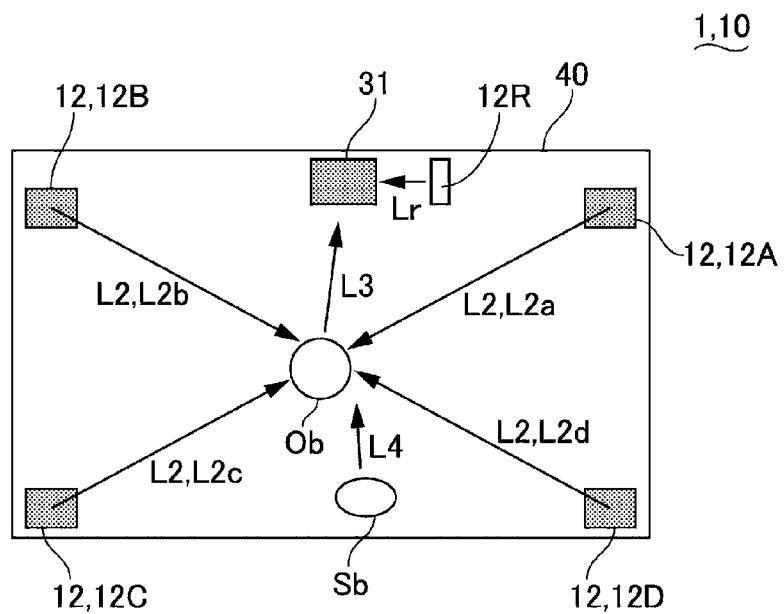

FIGS. 6A and 6B are explanatory diagrams showing a configuration example when a reference light source is used in the optical position detection device 10 according to first and second embodiment of the invention. FIG. 6A is an explanatory diagram showing a stereoscopic layout of the detection light sources. FIG. 6B is an explanatory diagram showing a planar layout of the detection light sources. Note that the basic configuration is the same as that of the embodiments that have been explained with reference to FIGS. 1 to 5. The same reference numerals are assigned to the common parts and their explanation will be omitted.

As shown in FIGS. 6A and 6B, similar to the first embodiment, an optical position detection device 10 also has plural detection light sources 12 that output detection light L2 and a first light receiving unit 31 that receives detection light L3 reflected by the target object located in an output space of detection light L2 (detection target space 10R).

In the optical position detection device 10, a reference light source 12R with its light emitting part directed toward the first light receiving unit 31 is provided. The reference light source 12R includes an LED (light emitting diode) driven by the control IC 70 explained with reference to FIG. 1 similar to the detection light sources 12. Note that reference light Lr output from the reference light source 12R is allowed not to enter a visual surface 41 side (the detection target space 10R) of a visual surface component member 40, but to enter the first light receiving unit 31 not via the detection target space 10R because of the direction of the reference light source 12R, a light-shielding cover (not shown) provided in the reference light source 12R.

In the optical position detection device 10, in place of the direct differential driving among the detection light L2, differential driving between the detection light L2 and the reference light Lr is used. Finally, the same result as the result from the direct differential driving among the detection light L2 is derived. The detection principle will be mathematically explained using an optical path function as below. First, the respective parameters are given as follows.

T=reflectance of target object Ob;
$A_t$=distance function of detection light L2a output from detection light source 12A, reflected by target object Ob, and reaching first light receiving unit 31;
A=detection intensity of first light receiving unit 31 when detection light source 12A is turned on with target object Ob existing in detection target space 10R;
$C_t$=distance function of detection light L2c output from detection light source 12C, reflected by target object Ob, and reaching first light receiving unit 31;
C=detection intensity of first light receiving unit 31 when detection light source 12C is turned on with target object Ob existing in detection target space 10R;
$R_s$=distance function from reference light source 12R to first light receiving unit 31; and
R=detection intensity of first light receiving unit 31 when only reference light source 12R is turned on.

Note that light emission intensity of the detection light source 12A, the detection light source 12C, and the reference light source 12R is expressed by a product of the drive current and an emission coefficient, and the emission coefficient is set to "1" in the following explanation. Further, in the differential driving, given that the drive current for the detection light source 12A is $I_A$, the drive current for the detection light source 12C is $I_C$, and the drive current for the reference light source 12R is $I_R$ when the received light intensity in the first light receiving unit 31 is equal. Further, the detection intensity when only the reference light source 12R is turned on at differential driving is assumed to be the same in the differential driving between the detection light source 12A and itself and the differential driving between the detection light source 12C and itself.

If the above described differential driving is performed with the target object Ob existing in the detection target space 10R, and the following relations are obtained.

$$A = T \times A_t \times I_A + \text{ambient light} \qquad \text{Eq. (6)}$$

$$C = T \times C_t \times I_C + \text{ambient light} \qquad \text{Eq. (7)}$$

$$R = R_s \times I_R + \text{ambient light} \qquad \text{Eq. (8)}$$

Here, the detection intensity in the first light receiving unit 31 at differential driving is equal, and the following equations are derived from the equations (6) and (8).

$$T \times A_t \times I_A + \text{ambient light} = R_s \times I_R + \text{ambient light}$$

$$T \times A_t \times I_A = R_s \times I_R$$

$$T \times A_t = R_s \times I_R / I_A \qquad \text{Eq. (9)}$$

Also, the following equations are derived from the equations (7) and (8).

$$T \times C_t \times I_C + \text{ambient light} = R_s \times I_R + \text{ambient light}$$

$$T \times C_t \times I_C = R_s \times I_R$$

$$T \times C_t = R_s \times I_R / I_C \qquad \text{Eq. (10)}$$

Further, the ratio $P_{AC}$ of the distance functions $A_t$ and $C_t$ is defined by the following equation.

$$P_{AC} = A_t / C_t \qquad \text{Eq. (11)}$$

Accordingly, from equations (9) and (10), the ratio $P_{AC}$ of the distance functions is expressed by the following equation.

$$P_{AC} = I_C / I_A \qquad \text{Eq. (12)}$$

In the equation (12), there is no term of ambient light. Note that, regarding the mathematical model, correction for cancelling out the influence of the detection light L2 that have not been reflected by the target object Ob but entered may be performed. Further, the same principle basically holds even in the case in which the detection intensity of the first light receiving unit 31 when only the reference light source 12R is set to different values in the differential driving of the detection light source 12A and the differential driving of the detection light source 12C.

Here, the detection light sources 12 are point light sources and the light intensity at a certain point is inversely proportional to the square of the distances from the light sources. Therefore, a ratio between a separation distance P1 from the detection light source 12A through the target object Ob to the first light receiving unit 31 and a separation distance P2 from the detection light source 12C through the target object Ob to the first light receiving unit 31 is obtained by the following equation.

$$P_{AC} = (P1)^2 : (P2)^2$$

Thus, an equal ratio line corresponding to the ratio P1:P2 may be set with reference to the detection light source 12A and the detection light source 12C within the XY plane. And the target object Ob is located on the equal ratio line.

Similarly, by differentially driving the detection light source 12B and the detection light source 12D and obtaining a ratio of a distance between the detection light source 12B and the target object Ob and a ratio of a distance between the detection light source 12D and the target object Ob, an equal ratio line may be set with reference to the detection light source 12B and the detection light source 12D within the XY plane. And the target object Ob is located on the equal ratio line.

Thus, by obtaining the intersection between the equal ratio line obtained from the differential driving of the detection light source 12A and the detection light source 12C and the equal ratio line obtained from the differential driving of the detection light source 12B and the detection light source 12D, the position (XY coordinates) of the target object Ob may be obtained. According to the configuration, since the differential driving of the detection light sources 12 and the reference light source 12R is used, the influences of the ambient light may be automatically corrected.

Also, in the optical position detection device 10, similar to the first and second embodiments, the position of the target object Ob may be detected without being affected by the detection light L4 reflected by the other object Sb than the target object Ob using the compensation light source unit 81 outputting the compensation light L5 that does not enter the detection target space 10R and the second light receiving unit 32 that does not receive the detection light L2, L3, L4, but receives the compensation light L5.

Other Embodiments

In the first and second embodiments, the compensation light source control unit 85 and the lighting pattern control part 88 have been provided outside of the control IC 70. However, the compensation light source control unit 85 and the lighting pattern control part 88 may be included in the control IC 70.

In the first and second embodiments, the second light receiving unit 32 has been arranged not to receive the detection light L3 reflected by the target object Ob or the detection light L4 reflected by the other object Sb than the target object Ob, but receive only the compensation light L5. However, the second light receiving unit 32 may be arranged to receive ambient light such as outdoor light under the same condition as that of the first light receiving unit 31. According to the configuration, when the difference between the received light intensity in the first light receiving unit 31 and the received light intensity in the second light receiving unit 32 is obtained, the difference takes a value obtained by eliminating the influences of the detection light L4 reflected by the other object Sb than the target object Ob and ambient light such as outdoor light. Thus, the position of the target object Ob may be detected without being affected by the detection light L4 reflected by the other object Sb than the target object Ob or ambient light such as outdoor light.

Application Examples to Other Position Detection Methods

The configuration using the compensation light source unit 81 outputting the compensation light L5 that does not enter the detection target space 10R and the second light receiving unit 32 that does not receive the detection light L2, L3, L4, but receives the compensation light L5 may be applied to optical position detection devices 10 employing methods that will be explained with reference to FIGS. 7 to 16 in addition to the optical position detection devices 10 employing the above described position detection methods.

Another Configuration Example 1 of Optical Position Detection Device 10

Figure 7:
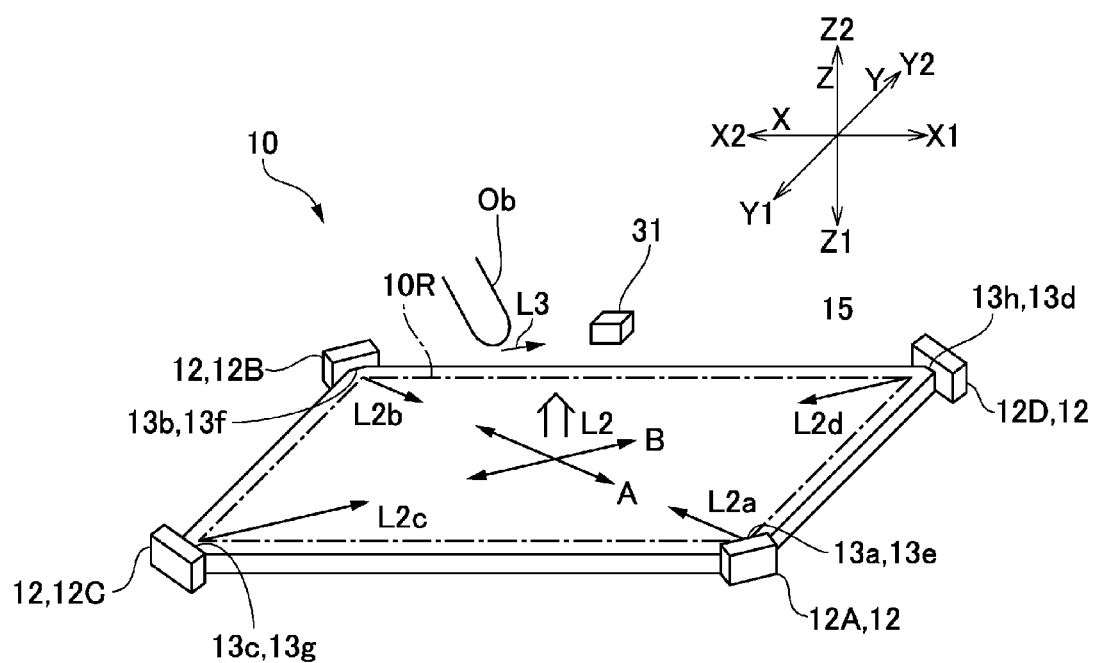
FIG. 7 is an explanatory diagram showing a main part of an optical position detection device according to another configuration example 1 of the invention.
Figure 8A:
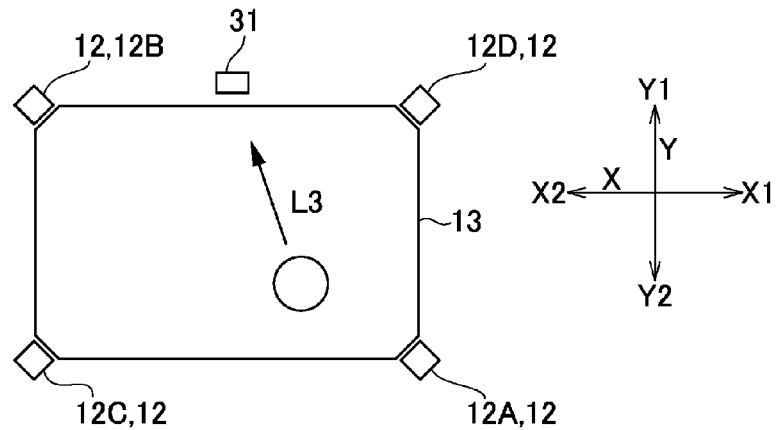
FIGS. 8A to 8C are explanatory diagrams of detection light used in an optical position detection device according to another configuration example 1 of the invention.
Figure 8B:
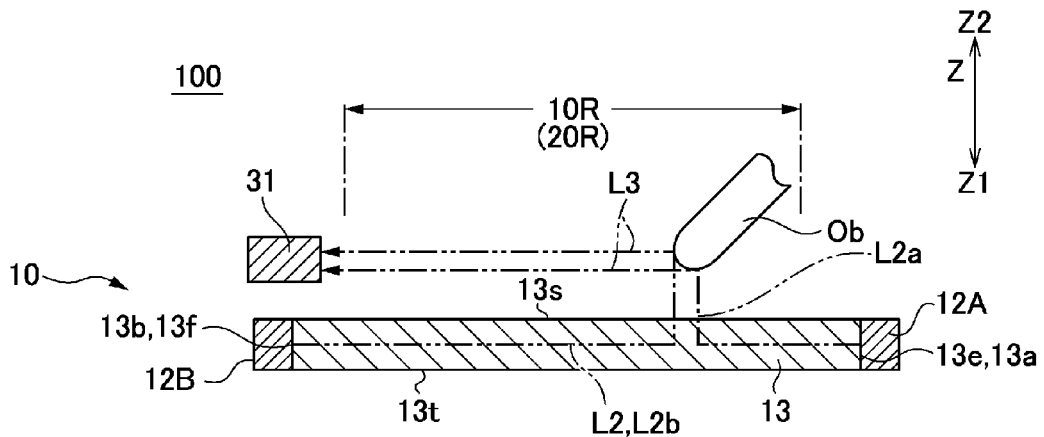
Figure 8C:
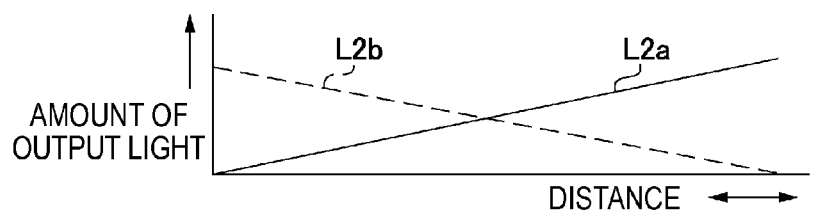

FIG. 7 is an explanatory diagram showing a main part of an optical position detection device 10 according to another configuration example 1 of the invention. FIGS. 8A to 8C are explanatory diagrams of detection light used in the optical position detection device 10 according to the other configuration example 1 of the invention. And FIG. 8A is an explanatory diagram showing a state in which light reflected by a target object are received in a light receiving unit in a plan view. FIG. 8B is an explanatory diagram showing the state in which light reflected by the target object are received in the light receiving unit in a sectional view. FIG. 8C is an explanatory diagram showing an attenuation state of detection light within a light-guiding plate. Note that the basic configuration is nearly the same as those of the first and second embodiments, and the same reference numerals are assigned to the common parts and their explanation will be omitted. Further, in the following explanation, illustration and explanation of the compensation light source unit 81, the second light receiving unit 32, and the reference light source 12R will be omitted.

Overall Configuration

As shown in FIGS. 7 to 8C, the optical position detection device 10 includes plural detection light sources 12 (detection light sources 12A to 12D) that output detection light L2 and a first light receiving unit 31 that detects part of detection light L3 reflected by the target object Ob within a detection target space 10R (output space of detection light L2) of the detection light L2 output from the detection light sources 12.

Further, the optical position detection device 10 has a light-guiding plate 13 including a transparent resin plate of polycarbonate, or acrylic resin, and the detection light L2 output from the detection light sources 12 are output to the detection target space 10R via the light-guiding plate 13. The light-guiding plate 13 has a nearly rectangular planar shape. And in the light-guiding plate 13, the surface directed toward the detection target space 10R is a light exit surface 13s. Furthermore, four corner parts 13a to 13d of the light-guiding plate 13 are used as light incident parts 13e to 13h of the detection light L2 output from the detection light sources 12. More specifically, the four detection light sources 12 (detection light sources 12A to 12D) are located to face the corner parts 13a to 13d of the light-guiding plate 13 with their light emission surfaces directed toward the corner parts 13a to 13d. Accordingly, the detection light L2 output from the detection light sources 12 enter from the corner parts 13a to 13d of the light-guiding plate 13, and then, are output from the light exit surface 13s while propagating within the light-guiding plate 13. For example, the detection light L2a output from the detection light source 12A is output from the light exit surface 13s while propagating within the light-guiding plate 13. Therefore, when the detection light L2 output from the light exit surface 13s of the light-guiding plate 13 to the detection target space 10R are reflected by the target object Ob located in the detection target space 10R, the detection light L3 reflected by the target object Ob are detected by the first light receiving unit 31.

Here, on a rear surface 13t or the light exit surface 13s of the light-guiding plate 13, a surface asperity structure, a prism structure, or a scattering layer (not shown) is provided. And due to the light scattering structure, the light entering from the corner parts 13a to 13d and propagating within are gradually deflected as they travel in the propagation direction and output from the light exit surface 13s. Further, at the light exit side of the light-guiding plate 13, an optical sheet such as a prism sheet or light scattering plate may be provided for uniformity of the detection light L2a to L2d according to need. Accordingly, the amount of light of the detection light L2a output to the detection target space 10R linearly attenuates with the distance from the detection light source 12A as shown by a solid line in FIG. 8C. Furthermore, the amount of light of the detection light L2b output to the detection target space 10R linearly attenuates with the distance from the detection light source 12B as shown by a dotted line in FIG.

8C. The detection light L2c, L2d output from the other detection light sources 12C, 12D similarly attenuate and are output from the light exit surface 13s. Therefore, the detection light L2 form light intensity distribution, which will be described later with reference to FIGS. 10A to 10D, in the detection target space 10R.

The first light receiving unit 31 includes a photoelectric conversion element such as a photodiode or phototransistor with its light receiving part directed toward the detection target space 10R in the nearly center position in the side part of the first light receiving unit 31 of the outer side of the detection target space 10R.

Position Detection Operation

FIGS. 9A to 9D are explanatory diagrams showing a state in which the detection light sources 12 (detection light sources 12A to 12D) are sequentially turned on in a predetermined pattern to form a light intensity distribution in the optical position detection device 10 according to the other configuration example 1 of the invention. FIGS. 10A to 10D are explanatory diagrams showing a state in which a light intensity distribution for coordinate detection is formed by detection light L2 output from the detection light sources 12 in the optical position detection device 10 according to the other configuration example 1 of the invention. Note that, in FIGS. 9A to 9D, the detection light sources 12 being turned on are shown in gray. FIGS. 11A and 11B are explanatory diagrams schematically showing a position detection principle in the optical position detection device 10 according to the other configuration example 1 of the invention. And FIG. 11A is an explanatory diagram showing intensity of detection light reflected by a target object. FIG. 11B is an explanatory diagram showing a state in which the light intensity distribution of the detection light is adjusted so that the intensity of the detection light reflected by the target object may be equal.

In the optical position detection device 10, when the detection light source 12A is turned on and the other detection light sources 12B to 12D are turned off, a light intensity distribution centered on the corner parts at one side X1 in the X-axis direction and one side Y1 in the Y-axis direction is formed in the detection target space 10R. When the detection light source 12B is turned on and the other detection light sources 12A, 12C, and 12D are turned off, a light intensity distribution centered on the corner parts at the other side X2 in the X-axis direction and the other side Y2 in the Y-axis direction is formed in the detection target space 10R. When the detection light source 12C is turned on and the other detection light sources 12A, 12B, and 12D are turned off, a light intensity distribution centered on the corner parts at the other side X2 in the X-axis direction and the one side Y1 in the Y-axis direction is formed in the detection target space 10R. When the detection light source 12D is turned on and the other detection light sources 12A to 12C are turned off, a light intensity distribution centered on the corner parts at the one side X1 in the X-axis direction and the other side Y2 in the Y-axis direction is formed in the detection target space 10R.

Figures 9A, 9C:
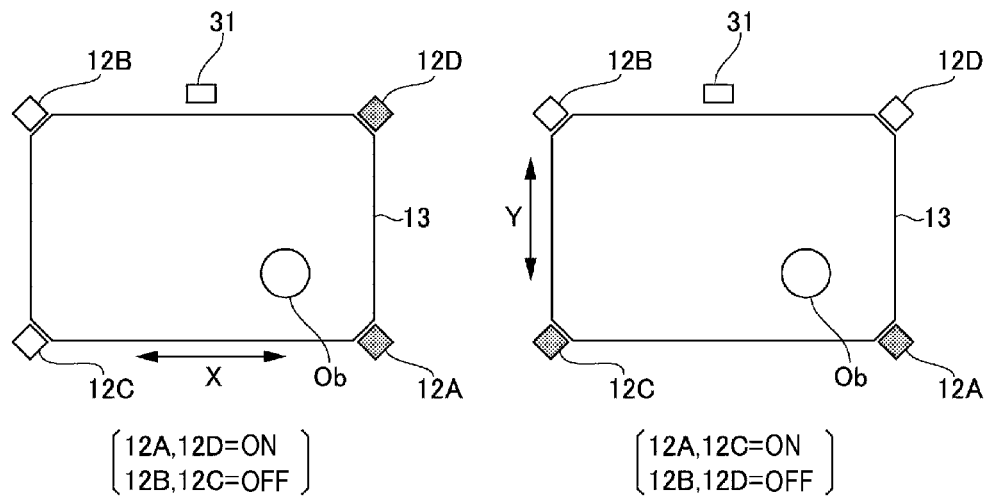
FIGS. 9A to 9D are explanatory diagrams showing a state in which detection light sources are sequentially turned on in a predetermined pattern to form light intensity distribution in an optical position detection device according to another configuration example 1 of the invention.
Figure 10A:
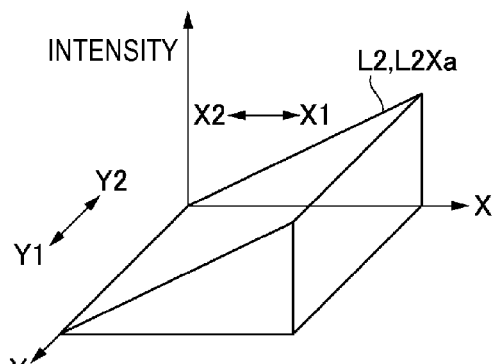
FIGS. 10A to 10D are explanatory diagrams showing a state in which light intensity distribution for coordinate detection is formed by detection light output from detection light sources in an optical position detection device according to another configuration example 1 of the invention.
Figure 11A:
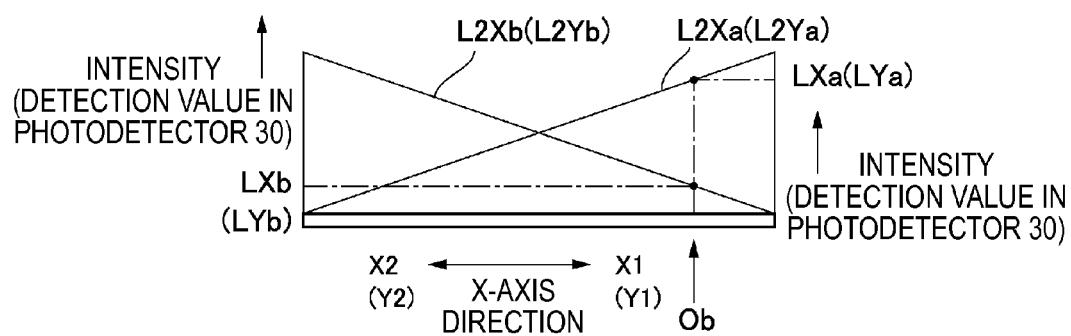
FIGS. 11A and 11B are explanatory diagrams schematically showing a position detection principle in an optical position detection device according to another configuration example 1 of the invention.
Figure 11B:
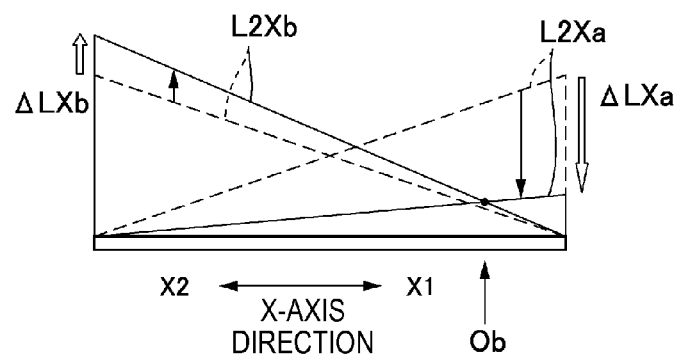

Therefore, when the detection light sources 12A, 12D are turned on and the other detection light sources 12B, 12C are turned off at a first operation in a first coordinate information detection period as shown in FIG. 9A, a first light intensity distribution for X-coordinate detection L2Xa (first light intensity distribution for first coordinate detection) in which the intensity of the detection light monotonically decreases from the one side X1 toward the other side X2 in the X-axis direction is formed as shown in FIG. 10A. In the embodiment, in the first light intensity distribution for X-coordinate detection L2Xa, the intensity of the detection light L2 linearly decreases from the one side X1 toward the other side X2 in the X-axis direction and the intensity of the detection light L2 is constant in the Y-axis direction.

Figures 9B, 9D:
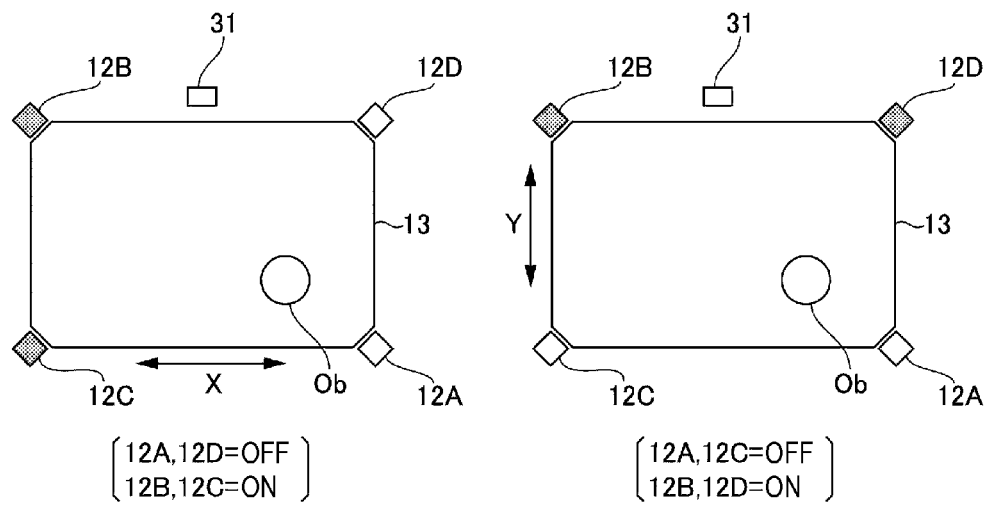
Figure 10B:
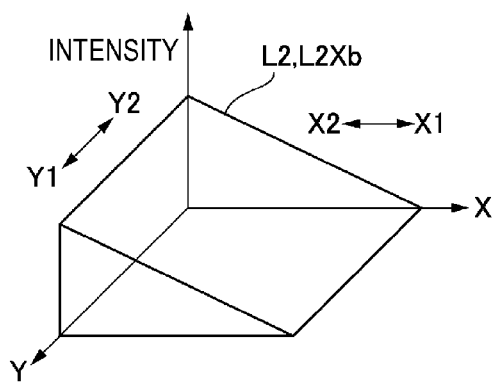

On the other hand, when the detection light sources 12B, 12C are turned on and the other detection light sources 12A, 12D are turned off at a second operation in the first coordinate information detection period as shown in FIG. 9B, a second light intensity distribution for X-coordinate detection L2Xb (second light intensity distribution for first coordinate detection) in which the intensity of the detection light monotonically decreases from the other side X2 toward the one side X1 in the X-axis direction is formed as shown in FIG. 10B. In the embodiment, in the second light intensity distribution for X-coordinate detection L2Xb, the intensity of the detection light L2 linearly decreases from the other side X2 toward the one side X1 in the X-axis direction and the intensity of the detection light L2 is constant in the Y-axis direction.

Figure 10C:
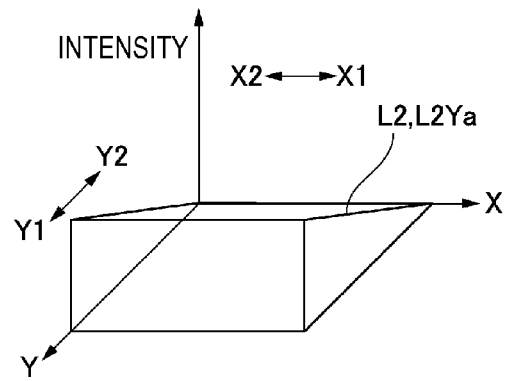

Further, when the detection light sources 12A, 12C are turned on and the other detection light sources 12B, 12D are turned off at the first operation in a second coordinate information detection period as shown in FIG. 9C, a first light intensity distribution for Y-coordinate detection L2Ya (first light intensity distribution for second coordinate detection) in which the intensity of the detection light monotonically decreases from the one side Y1 toward the other side Y2 in the Y-axis direction is formed as shown in FIG. 10C. In the embodiment, in the first light intensity distribution for Y-coordinate detection L2Ya, the intensity of the detection light L2 linearly decreases from the one side Y1 toward the other side Y2 in the Y-axis direction and the intensity of the detection light L2 is constant in the X-axis direction.

Figure 10D:
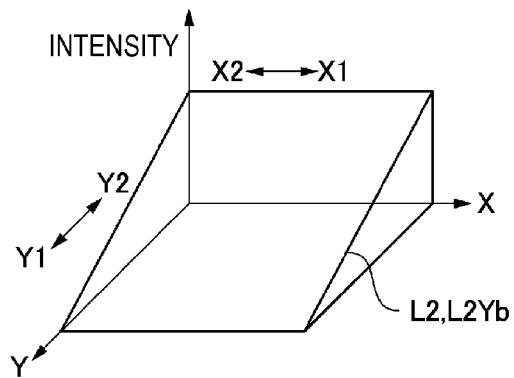

On the other hand, when the detection light sources 12B, 12D are turned on and the other detection light sources 12A, 12C are turned off at the second operation in the second coordinate information detection period as shown in FIG. 9D, a second light intensity distribution for Y-coordinate detection L2Yb (second light intensity distribution for second coordinate detection) in which the intensity of the detection light monotonically decreases from the other side Y2 toward the one side Y1 in the Y-axis direction is formed as shown in FIG. 10D. In the embodiment, in the second light intensity distribution for Y-coordinate detection L2Yb, the intensity of the detection light L2 linearly decreases from the other side Y2 toward the one side Y1 in the Y-axis direction and the intensity of the detection light L2 is constant in the X-axis direction.

In the optical position detection device 10, the detection light sources 12 for formation of light intensity distributions are turned on and light intensity distributions of the detection light L2 is formed in the detection target space 10R and the detection light L2 reflected by the target object Ob are detected in the first light receiving unit 31, and the position detection unit 50 detects the position of the target object Ob within the detection target space 10R based on the detection result in the first light receiving unit 31. Now, a principle of coordinate detection will be explained with reference to FIGS. 11A and 11B.

In the optical position detection device 10, the position in the X-axis direction (X-coordinate) is detected using the first light intensity distribution for X-coordinate detection L2Xa and the second light intensity distribution for X-coordinate detection L2Xb explained with reference to FIGS. 10A and 10B. Concurrently, the detection light sources 12A, 12D and the detection light sources 12B, 12C are driven at opposite phases. More specifically, at the first operation in the first coordinate information detection period, the detection light sources 12A, 12D are turned on and the detection light sources 12B, 12C are turned off, and the first light intensity distribution for X-coordinate detection L2Xa shown in FIG. 10A is formed. Then, at the second operation in the first coordinate information detection period, the detection light sources 12A, 12D are turned off and the detection light sources 12B, 12C are turned on, and the second light intensity distribution for X-coordinate detection L2Xb shown in FIG. 10B is formed. Therefore, when the target object Ob is placed in the detection target space 10R, the detection light L2 is reflected by the target object Ob, and part of the reflected light is detected by the first light receiving unit 31. Here, the first light intensity distribution for X-coordinate detection L2Xa and the second light intensity distribution for X-coordinate detection L2Xb have fixed distributions. Thus, the position detection unit may detect the X-coordinate of the target object Ob using a method, which will be explained as below with reference to FIGS. 11A and 11B by comparing the detection intensity in the first light receiving unit 31 at the first operation for X-coordinate detection and the detection intensity in the first light receiving unit 31 at the second operation for X-coordinate detection.

First, as shown in FIG. 11A, the first light intensity distribution for X-coordinate detection L2Xa and the second light intensity distribution for X-coordinate detection L2Xb are formed so that their absolute values may be equal and opposite in the X-axis direction in the first operation and the second operation in the first coordinate information detection period. If the detection value LXa in the first light receiving unit 31 at the first operation and the detection value LXb in the first light receiving unit 31 at the second operation are equal under the condition, it is known that the target object Ob is located at the center in the X-axis direction.

On the other hand, if the detection value LXa in the first light receiving unit 31 at the first operation and the detection value LXb in the first light receiving unit 31 at the second operation are different, the amounts of control (drive currents) for the detection light sources 12 are adjusted so that the detection values LXa, LXb may be equal, and, again, the first light intensity distribution for X-coordinate detection L2Xa is formed and the second light intensity distribution for X-coordinate detection L2Xb is formed again as shown in FIG. 11B. Then, the detection value LXa in the first light receiving unit 31 at the first operation and the detection value LXb in the first light receiving unit 31 at the second operation are made equal. The X-coordinate of the target object Ob may be detected from the ratio or difference between the amounts of control (current values) for the detection light sources 12A, 12D and the amounts of control (current values) for the detection light sources 12B, 12C when the differential driving is performed. Further, the X-coordinate of the target object Ob may be detected from the ratio or difference between the amount of adjustment ΔLXa of the amounts of control for the detection light sources 12 at the first operation for X-coordinate detection and the amount of adjustment ΔLXb of the amounts of control for the detection light sources 12 at the second operation for X-coordinate detection. According to the method, even in the case in which the other ambient light than the detection light L2, infrared components contained in the outdoor light enter the first light receiving unit 31, when the amounts of control for the detection light sources 12 are adjusted so that the detection values LXa, LXb may be equal, the intensity of the infrared components contained in the ambient light is cancelled out and the infrared components contained in the ambient light do not affect the detection accuracy.

Note that, in the optical position detection device 10, the position in the Y-axis direction (Y-coordinate) is detected using the first light intensity distribution for Y-coordinate detection L2Ya and the second light intensity distribution for Y-coordinate detection L2Yb explained with reference to FIGS. 10C and 10D. More specifically, the detection light sources 12A, 12C and the detection light sources 12B, 12D are driven at opposite phases. That is, as shown in FIG. 9C, at the first operation in the second coordinate information detection period, the detection light sources 12A, 12C are turned on and the detection light sources 12B, 12D are turned off, and the first light intensity distribution for Y-coordinate detection L2Ya shown in FIG. 10C is formed. Then, as shown in FIG. 9D, at the second operation in the second coordinate information detection period, the detection light sources 12A, 12C are turned off and the detection light sources 12B, 12D are turned on, and the second light intensity distribution for Y-coordinate detection L2Yb shown in FIG. 10D is formed. Therefore, the position detection unit may detect the Y-coordinate of the target object Ob using the same method as the method of detecting the X-coordinate by comparing the detection value LYa in the first light receiving unit 31 at the first operation and the detection intensity LYb in the first light receiving unit 31 at the second operation.

Also, in the optical position detection device 10 having the configuration, similar to the first and second embodiments, the position of the target object Ob may be detected without being affected by the detection light L4 reflected by the other object Sb than the target object Ob using the compensation light source unit 81 outputting the compensation light L5 that does not enter the detection target space 10R and the second light receiving unit 32 that does not receive the detection light L2, L3, L4, but receives the compensation light L5.

Another Configuration Example 2 of Optical Position Detection Device

Figure 12:
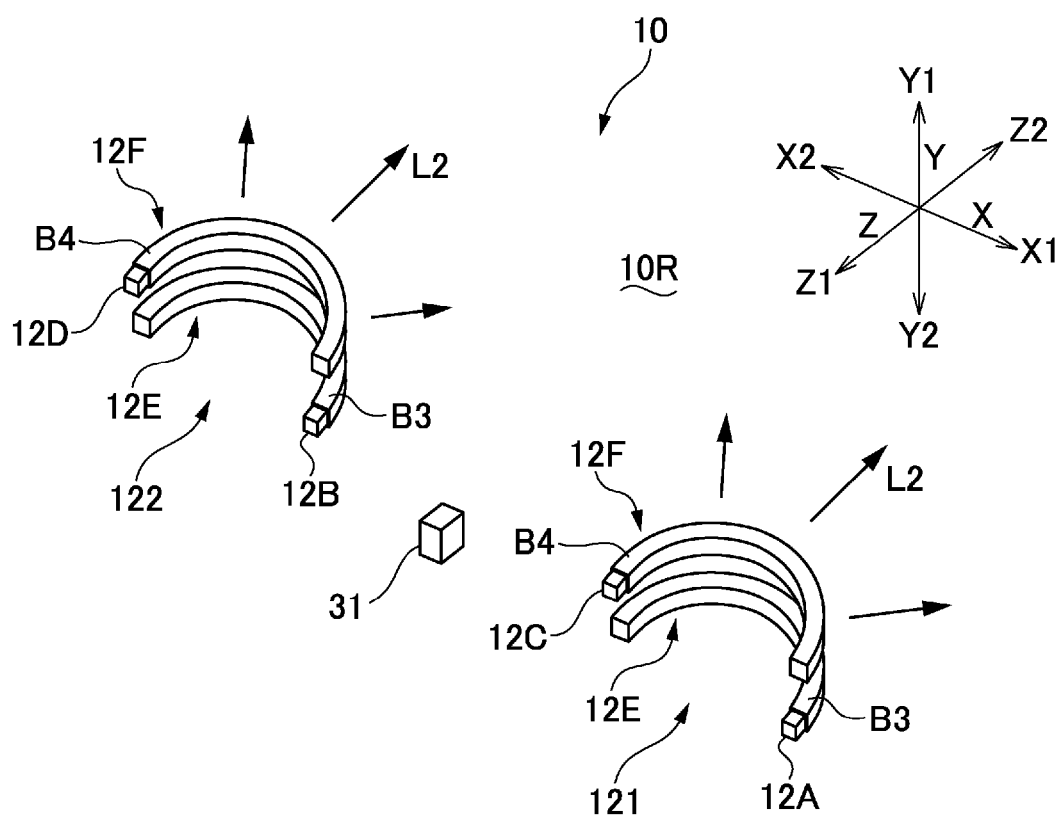
FIG. 12 is an explanatory diagram schematically showing a main part of an optical position detection device according to another configuration example 2 of the invention.
Figure 13A:
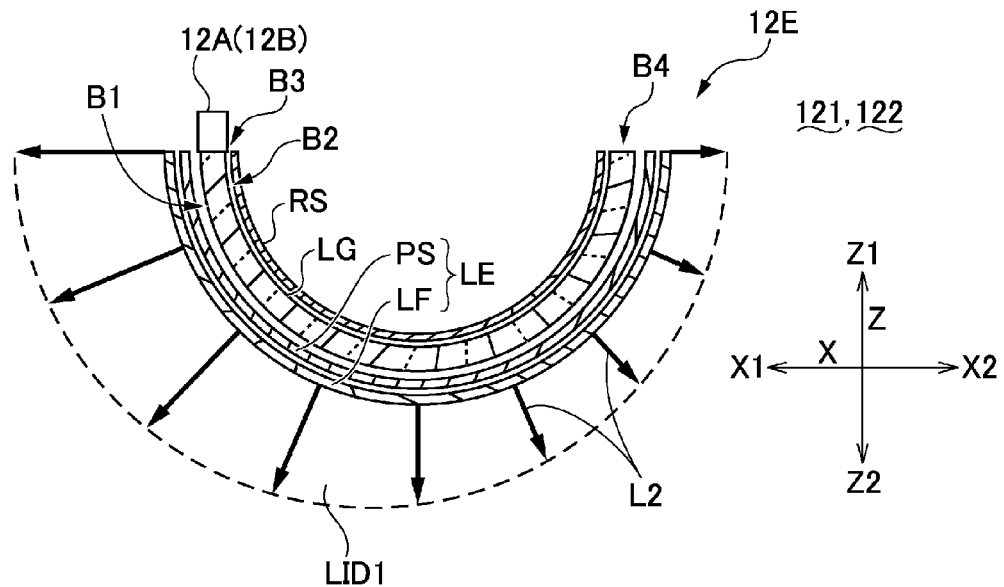
FIGS. 13A and 13B are explanatory diagrams of two light source units forming a light source section in an optical position detection device according to another configuration example 2 of the invention.
Figure 13B:
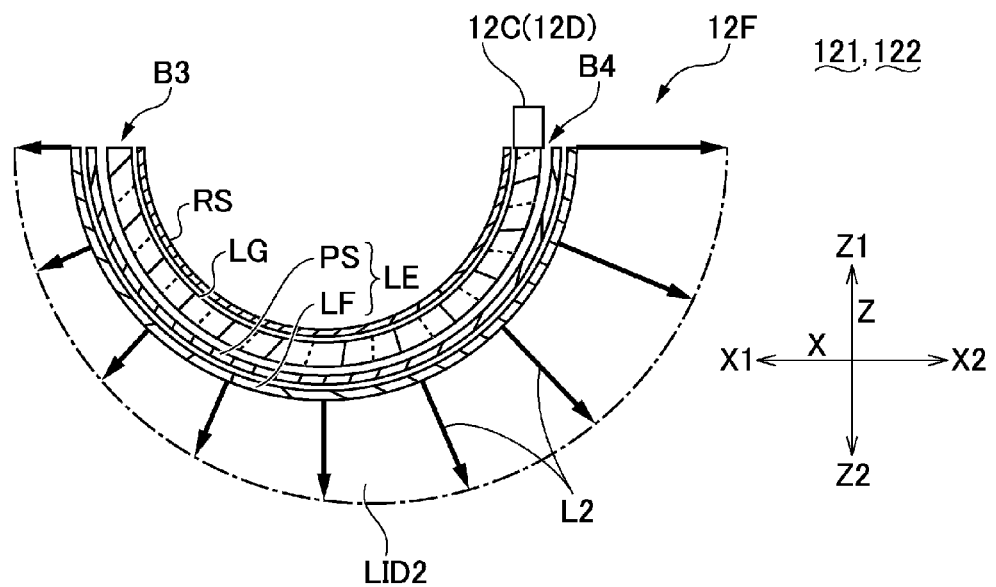
Figure 14A:
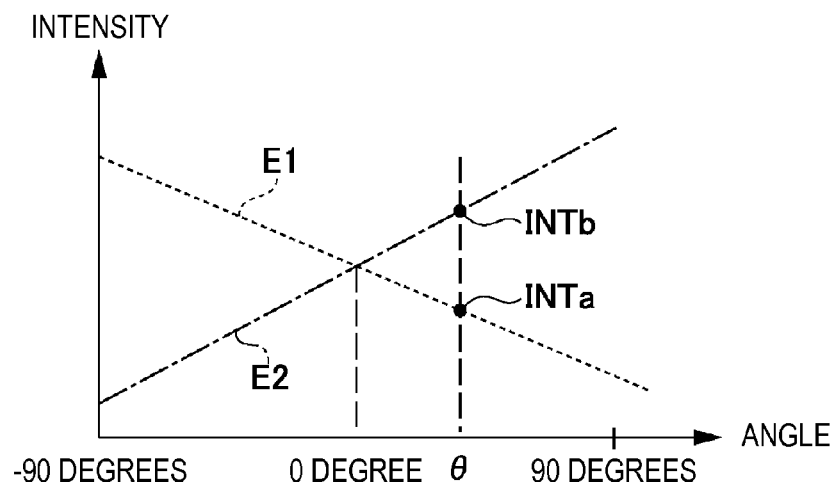
FIGS. 14A and 14B are explanatory diagrams showing a position detection principle in an optical position detection device according to another configuration example 2 of the invention.
Figure 14B:
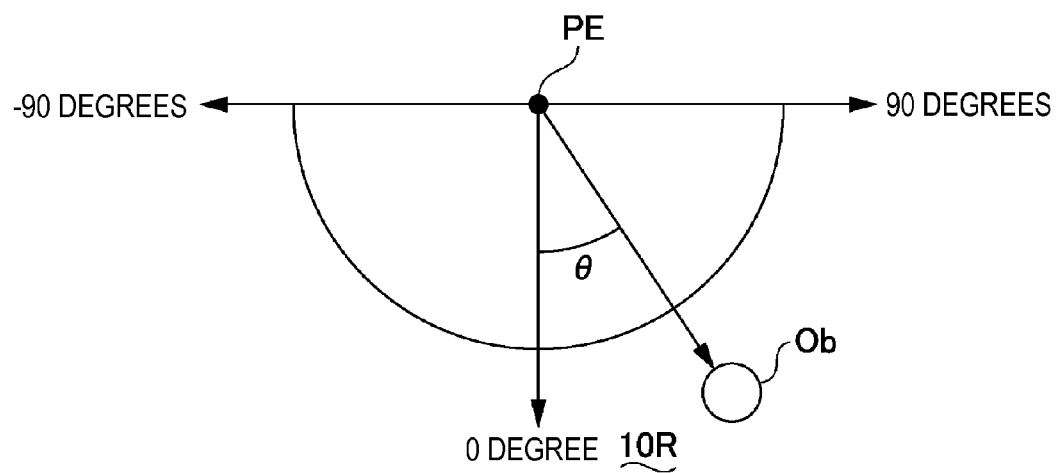
Figure 15:
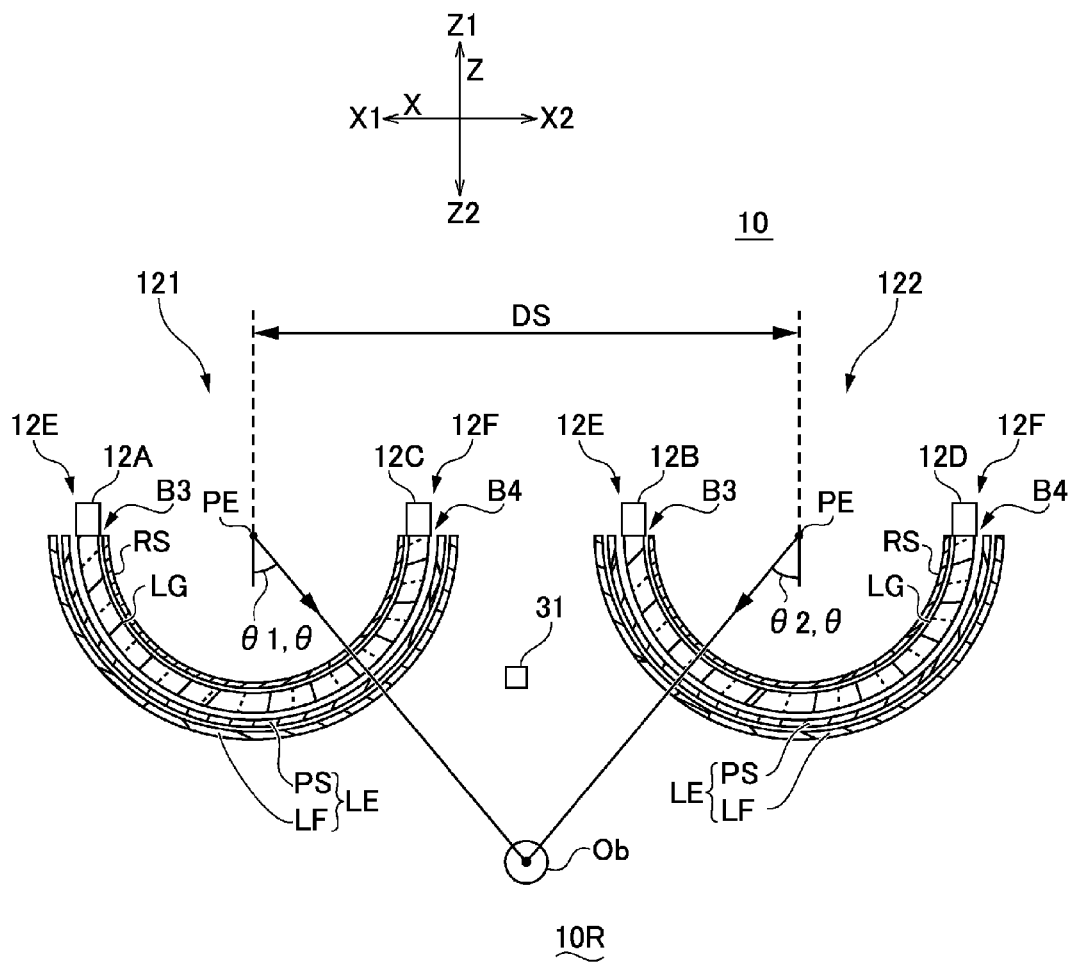
FIG. 15 is an explanatory diagram showing a method of locating a target object in an optical position detection device according to another configuration example 2 of the invention.

FIG. 12 is an explanatory diagram schematically showing a main part of an optical position detection device according to another configuration example 2 of the invention. FIGS. 13A and 13B are explanatory diagrams of two light source units forming a light source section in the optical position detection device 10 according to the other configuration example 2 of the invention. FIGS. 14A and 14B are explanatory diagrams showing a position detection principle in the optical position detection device 10 according to the other configuration example 2 of the invention. And FIG. 14A is an explanatory diagram of a light intensity distribution and FIG. 14B is an explanatory diagram of a method of acquiring position information (azimuth information) of the target object. FIG. 15 is an explanatory diagram showing a method of locating the target object Ob in the optical position detection device 10 according to the other configuration example 2 of the invention. Note that the basic configuration is the same as that of the first embodiment, and the same reference numerals are assigned to the common parts and their explanation will be omitted. Further, in the following explanation, illustration and explanation of the compensation light source unit 81, the second light receiving unit 32, and the reference light source 12R will be omitted.

In FIGS. 12, 13A, and 13B, the optical position detection device 10 has plural light source modules 121, 122 that output detection light L2 in a semicircle direction, and a first light receiving unit 31 that detects part of detection light L3 reflected by the target object Ob of the detection light L2 output from the light source modules 121, 122. The light source modules 121, 122 are provided in the same positions in the Z-axis direction, and the respective light source modules 121, 122 output the detection light L2. In the embodiment, a detection target space 10R in which the position of the target object Ob is detected is formed by the output space of the detection light L2. Here, the light source module 121 radially outputs the detection light L2 in a first coordinate information detection period and the light source module 122 sequentially and radially outputs the detection light L2 in a second coordinate information detection period. Therefore, a position detection unit 50 detects the position of the target object Ob based on received light intensity of the detection light L2 in the first light receiving unit 31 in the first coordinate information detection period and received light intensity of the detection light L2 in the first light receiving unit 31 in the second coordinate information detection period.

In employment of the position detection method, as shown in FIG. 12, the light source module 121 includes a detection light source part 12E and a detection light source part 12F provided to be superimposed in the Y-axis direction. And the light source module 122 also includes the detection light source part 12E and the detection light source part 12F provided to be superimposed in the Y-axis direction like the light source module 121.

Here, as shown in FIG. 13A, the detection light source part 12E includes a detection light source 12A of a light emitting device such as a light emitting diode that outputs infrared light and a circular light guide LG, and the detection light source 12A is provided on one end B3 of the light guide LG. Further, the detection light source part 12E includes a circular irradiation direction setting part LE having an optical sheet PS, a louver film LF, along the circular outer circumferential surface of the of the light guide LG and includes a circular reflection sheet RS along the circular inner circumferential surface of the light guide LG.

Further, as shown in FIG. 13B, the detection light source part 12F also includes a detection light source 12C of a light emitting device such as a light emitting diode that outputs infrared light and a circular light guide LG, and the detection light source 12C is provided on the other end B4 of the light guide LG like the detection light source part 12E. Furthermore, the light source part 12F also includes a circular irradiation direction setting part LE having an optical sheet PS, a louver film LF, along the circular outer circumferential surface of the of the light guide LG and includes a circular reflection sheet RS along the circular inner circumferential surface of the light guide LG like the detection light source part 12E.

Note that at least one of the outer circumferential surface and the inner circumferential surface of the light guide LG is processed for adjustment of the output efficiency of the detection light from the light guide LG, and, as the processing method, a method of printing reflection dots, a molding method of providing concavities and convexities by a stamper or injection, and a grooving method may be employed.

In the optical position detection device 10 having the configuration, in the light source module 121, when the detection light source 12A turns on in the detection light source part 12E at the first operation in the first coordinate information detection period, the detection light L2 is output to the detection target space 10R and a first light intensity distribution LID1 is formed in the detection target space 10R. The first light intensity distribution LID1 is an intensity distribution in which the intensity of the output light monotonically decreases from the angular direction corresponding to the one end B3 toward the angular direction corresponding to the other end B4 as shown by lengths of arrows in FIG. 13A.

On the other hand, when the detection light source 12C turns on in the detection light source part 12F at the second operation in the first coordinate information detection period, the detection light is output to the detection target space 10R and a second light intensity distribution LID2 is formed in the detection target space 10R. The second light intensity distribution LID2 is an intensity distribution in which the intensity of the output light monotonically decreases from the angular direction corresponding to the other end B4 toward the angular direction corresponding to the one end B3 as shown by lengths of arrows in FIG. 13B.

Note that, in the light source module 122, when the detection light source 12B turns on in the detection light source part 12E at the first operation in the second coordinate information detection period, and, in the light source module 122, when the detection light source 12D turns on in the detection light source part 12F at the second operation in the second coordinate information detection period, the first light intensity distribution LID1 and the second light intensity distribution LID2 are also formed like the light source module 121. Therefore, as will be explained below, the position of the target object Ob may be detected using the first light intensity distribution LID1 and the second light intensity distribution LID2.

First, in the detection light source part 12E of the light source module 121, when the first light intensity distribution LID1 is formed, the irradiation directions of the detection light L2 and the intensity of the detection light L2 have a relationship shown by line E1 in FIG. 14A. Further, in the detection light source part 12F of the light source module 121, when the second light intensity distribution LID2 is formed, the irradiation directions of the detection light L2 and the intensity of the detection light L2 have a relationship shown by line E2 in FIG. 14A. Here, as shown in FIGS. 14B and 15, it is assumed that the target object Ob exists in the direction at the angle θ seen from the center PE of the light source module 121 (the center of the detection light source part 12E). In this case, when the first light intensity distribution LID1 is formed, the intensity of the detection light L2 in the position in which the target object Ob exists is INTa. On the other hand, when the second light intensity distribution LID2 is formed, the intensity of the detection light L2 in the position in which the target object Ob exists is INTb. Therefore, by obtaining the relationship between the intensity INTa, INTb by comparing the detection intensity in the first light receiving unit 31 when the first light intensity distribution LID1 is formed and the detection intensity in the first light receiving unit 31 when the second light intensity distribution LID2 is formed, the angle θ (angle θ1) of the direction in which the target object Ob is located may be obtained with reference to the center PE of the light source module 121.

The operation is also performed in the light source module 122 and the angle θ (angle θ2) of the direction in which the target object Ob is located is obtained. And thus, the position of the target object Ob may be specified with reference to the centers PE of the light source modules 121, 122.

In employment of the method in the light source module 121, the angle θ (angle θ1) of the direction in which the target object Ob is located is obtained from a ratio between drive currents after adjustment of the drive currents when the detection light sources 12A, 12C are driven so that the detection intensity in the first light receiving unit 31 when the first light intensity distribution LID1 is formed by the detection light source part 12E and the detection intensity in the first light receiving unit 31 when the second light intensity distribution LID2 is formed by the detection light source part 12F may be equal. Further, in the light source module 122, the angle θ (angle θ2) of the direction in which the target object Ob is located is obtained from a ratio between drive currents after adjustment of the drive currents when the detection light sources 12B, 12D are driven so that the detection intensity in the first light receiving unit 31 when the first light intensity distribution LID1 is formed by the detection light source part 12E and the detection intensity in the first light receiving unit 31 when the second light intensity distribution LID2 is formed by the detection light source part 12F may be equal. Thus, it is known that the target object Ob is located at the intersection of the directions defined by the angles θ1, θ2.

Also, in the optical position detection device 10 having the configuration, similar to the first and second embodiments, the position of the target object Ob may be detected without being affected by the detection light L4 reflected by the other object Sb than the target object Ob using the compensation light source unit 81 outputting the compensation light L5 that does not enter the detection target space 10R and the second light receiving unit 32 that does not receive the detection light L2, L3, L4, but receives the compensation light L5.

Specific Example 1 of Apparatus 1 with Position Detection Function

Figure 16A:
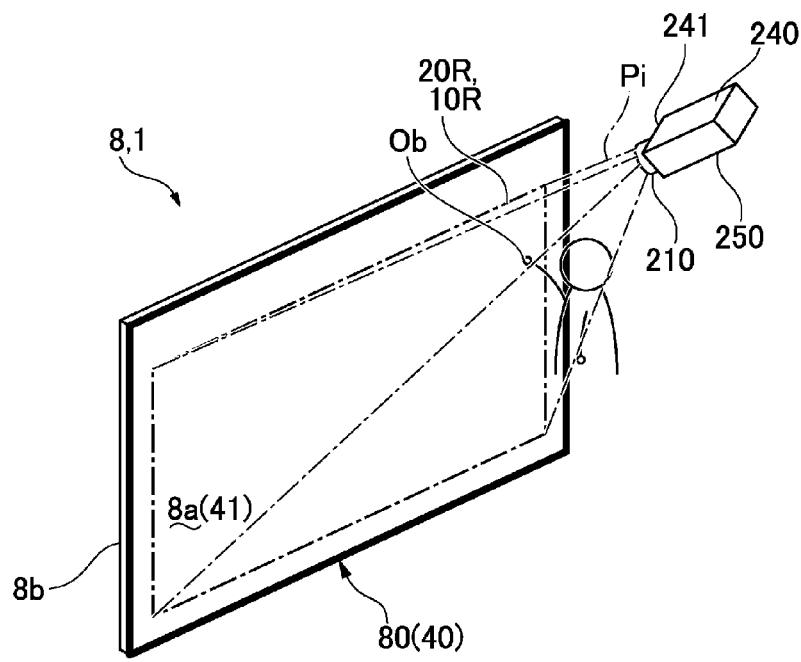
FIGS. 16A and 16B are explanatory diagrams of a screen apparatus with an optical position detection function to which the invention is applied.
Figure 16B:
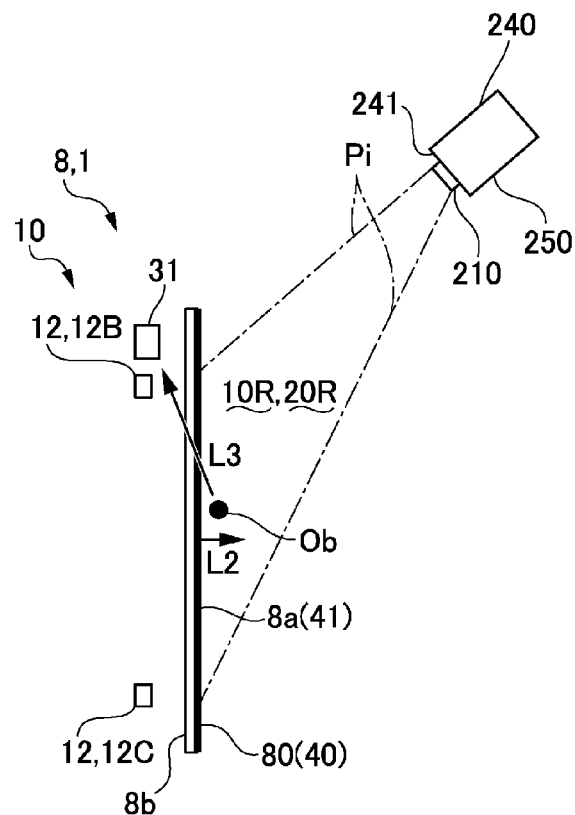

Referring to FIGS. 16A and 16B, an example of forming an apparatus 1 with a position detection function as a screen apparatus with position detection function using a screen as a visual surface component member 40 of the apparatus 1 will be explained. FIGS. 16A and 16B are explanatory diagrams of a screen apparatus with position detection function (apparatus 1 with the position detection function) to which the invention is applied. And FIG. 16A is an explanatory diagram schematically showing a state of the screen apparatus with position detection function seen from obliquely above. FIG. 16B an explanatory diagram schematically showing a state seen from a lateral direction. Note that, in the screen apparatus with position detection function, the configuration of the optical position detection device 10 is the same as that has been explained with reference to FIGS. 1 to 6B, and the same reference numerals are assigned to the common parts and their explanation will be omitted.

The screen apparatus with position detection function 8 shown in FIGS. 16A, 16B includes a screen 80 (the visual surface component member 40) on which an image is projected from an image projection device 250 (image generation device) referred to as a liquid crystal projector or digital micromirror device, and the optical position detection device 10 that has been explained with reference to FIGS. 1 to 6B, and the image projection device 250 enlarges and projects image representation light Pi from a projection lens system 210 provided in a front surface part 241 of a casing 240 toward the screen apparatus 8. Therefore, in the screen apparatus with position detection function 8, a visual surface 41 on which information is visually recognized is formed by a screen surface 8a on which the image is projected in the screen 80.

In the screen apparatus with position detection function 8, the optical position detection device 10 includes plural detection light sources 12 that output detection light L2 at the side of a rear surface 8b of the screen 80. Accordingly, the detection light sources 12 output the detection light L2 to the detection target space 10R set from the opposite side to the visual surface 41 side to the visual surface 41 side in the screen 80 (the visual surface component member 40). Further, a first light receiving unit 31 is provided at the side of the rear surface 8b of the screen 80 and detects detection light L3 reflected by the target object Ob and transmitted through the screen 80. Therefore, as the screen 80, a screen having light transmissivity for the detection light L2 is used. More specifically, the screen 80 includes a cloth with white paint applied on the screen surface 8a side or a white screen of an embossed white vinyl material, and has light transmissivity for the detection light L2 of infrared light. As the screen 80, a silver screen in silver color for higher light reflectance, a pearl screen with the cloth surface forming the screen surface 8a side resin-processed for higher light reflectance, and a bead screen with fine glass powder applied on the screen surface 8a side for higher light reflectance may be used, and, in this case, the screen 80 also has light transmissivity for the detection light L2 of infrared light. Note that, in the screen 80, a black light-shielding layer may be formed on the rear surface 8b for the purpose of improving the grade of images to be displayed. And in this case, plural light transmissive parts of holes are formed in the light-shielding layer.

In the screen apparatus with position detection function 8 having the configuration, the detection target space 10R is a square region seen from the normal direction relative to the screen apparatus 8, and superimposed on a region (image display region 20R) in which an image is projected by the image projection device 250 in the screen apparatus 8. Accordingly, in the screen apparatus with position detection function 8, for example, by putting the target object Ob such as a fingertip closer to a part of the image projected on the screen 80, the position of the target object Ob may be used as input information as a switching instruction of the images.

Note that, in the embodiment, the screen apparatus for the projection type display apparatus on which images are projected from the image projection device 250 has been explained as the screen apparatus with optical position detection function 8. However, the position detection device 10 may be provided on a screen for electronic blackboard and a screen apparatus with position detection function for electronic blackboard may be formed. Further, in the configuration example shown in FIGS. 16A and 16B, the first light receiving unit 31 has been provided on the side of the rear surface 8b of the screen 80, however, the first light receiving unit 31 may be provided on the front surface side (the screen surface 8a side) of the screen 80. Furthermore, the optical position detection device 10 that has been explained with reference to FIGS. 7 to 10D may be provided on the rear surface 8b or the front surface side (the screen surface 8a side) of the screen 80 for forming the screen apparatus with position detection function 8.

Specific Example 2 of Apparatus 1 with Position Detection Function

Figure 17A:
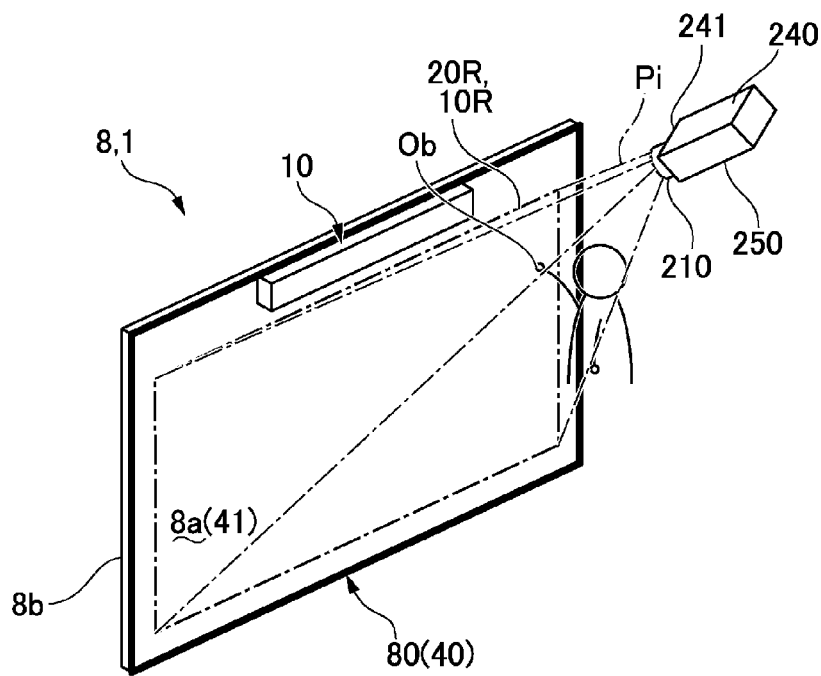
FIGS. 17A and 17B are explanatory diagrams of another screen apparatus with an optical position detection function to which the invention is applied.
Figure 17B:
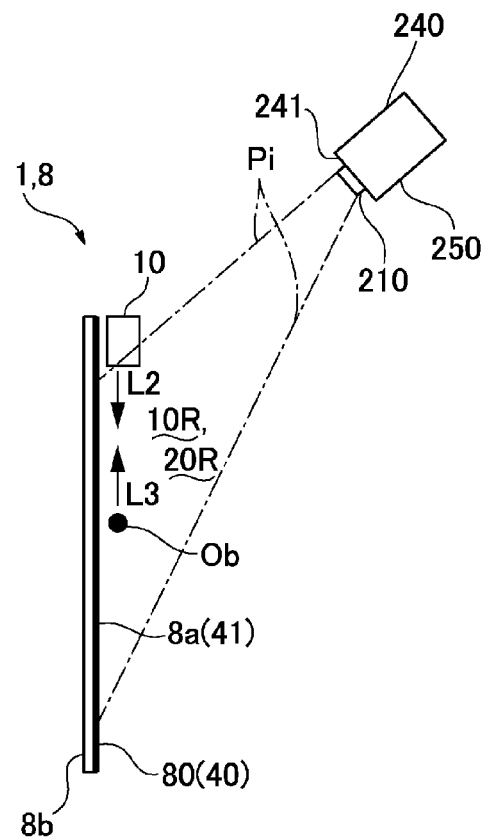

Referring to FIGS. 17A and 17B, an example of forming an apparatus 1 with a position detection function as another screen apparatus with position detection function using a screen as a visual surface component member 40 of the apparatus 1 will be explained. FIGS. 17A and 17B are explanatory diagrams of another screen apparatus with position detection function (apparatus 1 with the position detection function) to which the invention is applied. And FIG. 17A is an explanatory diagram schematically showing a state of the screen apparatus with position detection function seen from obliquely above and FIG. 17B is an explanatory diagram schematically showing a state seen from a lateral direction. Note that, in the screen apparatus with position detection function, the configuration of the optical position detection device 10 is the same as that has been explained with reference to FIGS. 11A to 15. And the same reference numerals are assigned to the common parts and their explanation will be omitted.

The screen apparatus with position detection function 8 shown in FIGS. 17A, 17B includes a screen 80 (the visual surface component member 40) on which an image is projected from an image projection device 250 (image generation device) referred to as a liquid crystal projector or digital micromirror device, and the optical position detection device 10 that has been explained with reference to FIGS. 11A to 15, and the image projection device 250 enlarges and projects image representation light Pi from a projection lens system 210 provided in a front surface part 241 of a casing 240 toward the screen apparatus 8. Therefore, in the screen apparatus with position detection function 8, a visual surface 41 on which information is visually recognized is formed by a screen surface 8a on which the image is projected in the screen 80.

In the screen apparatus with position detection function 8, the optical position detection device 10 includes plural detection light sources 12 that output detection light L2 and a first light receiving unit 31 at the front surface side (at the side of the screen surface 8a) of the screen 80. In the screen apparatus with position detection function 8 having the configuration, the detection target space 10R is superimposed on a region (image display region 20R) in which an image is projected by the image projection device 250. Accordingly, in the screen apparatus with position detection function 8, for example, by putting the target object Ob such as a fingertip closer to a part of the image projected on the screen 80, the position of the target object Ob may be used as input information as a switching instruction of the images.

Note that, in the embodiment, the screen apparatus for the projection type display apparatus on which images are projected from the image projection device 250 has been explained as the screen apparatus with position detection function 8. However, the optical position detection device 10 may be provided on a screen for electronic blackboard and a screen apparatus with position detection function for electronic blackboard may be formed.

Specific Example 3 of Apparatus 1 with Position Detection Function

Figure 18A:
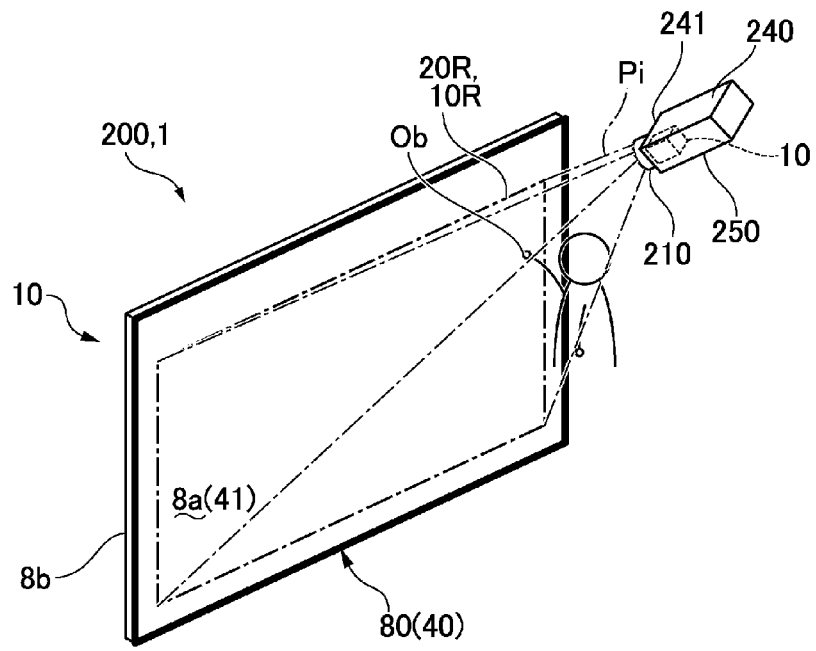
FIGS. 18A and 18B are explanatory diagrams of a projection-type display apparatus with an optical position detection function to which the invention is applied.
Figure 18B:
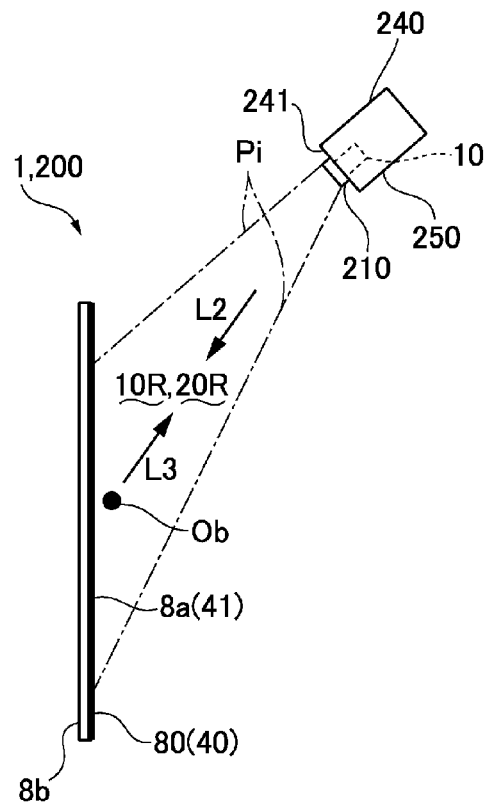

Referring to FIGS. 18A and 18B, an example of forming an apparatus with position detection function as a projection-type display apparatus with position detection function using a screen as a visual surface component member 40 of the apparatus 1 with a position detection function by the screen and an image projection device will be explained. FIGS. 18A and 18B are explanatory diagrams of a projection-type display apparatus with position detection function (apparatus 1 with the position detection function) to which the invention is applied. And FIG. 18A is an explanatory diagram schematically showing a state of the projection-type display apparatus with position detection function seen from obliquely above. FIG. 18B is an explanatory diagram schematically showing a state seen from a lateral direction. Note that, in the projection-type display apparatus with position detection function, the configuration of the optical position detection device 10 is the same as that has been explained with reference to FIGS. 1 to 6B and FIGS. 11A to 15. And the same reference numerals are assigned to the common parts and their explanation will be omitted.

The projection-type display device with position detection function 200 shown in FIGS. 18A, 18B includes an image projection device 250 (image generation device) referred to as a liquid crystal projector or digital micromirror device, and the optical position detection device 10 that has been explained with reference to FIGS. 1 to 6B and FIGS. 11A to 15. The image projection device 250 enlarges and projects image representation light Pi from a projection lens system 210 provided in a front surface part 241 of a casing 240 toward the screen apparatus 8. In the projection-type display apparatus 200, a visual surface 41 on which information is visually recognized is formed by a screen surface 8a on which the image is projected in a screen 80.

In the projection-type display apparatus with position detection function 200, the optical position detection device 10 is mounted on the image projection device 250 provided at the screen surface 8a (visual surface 41) side of the screen 80.

Accordingly, the optical position detection device 10 outputs detection light L2 from the image projection device 250 along the visual surface 41 of the screen 80 (the visual surface component member 40). Further, the optical position detection device 10 detects detection light L3 reflected by the target object Ob in the image projection device 250.

In the projection-type display apparatus with position detection function 200 having the configuration, the detection target space 10R is a square region seen from the normal direction relative to the screen 80, and superimposed on a region (image display region 20R) in which an image is projected by the image projection device 250 in the screen 80. Accordingly, in the projection-type display apparatus with optical position detection function 200, for example, by putting the target object Ob such as a fingertip closer to a part of the image projected on the screen 80, the position of the target object Ob may be used as input information as a switching instruction of the images.

What is claimed is:

1. An optical position detection device that detects a position of a target object, comprising:
   plural detection light sources that output detection light;
   a light source drive unit that drives the plural detection light sources;
   a first light receiving unit that receives the detection light reflected by the target object located in an output space of the detection light;
   a compensation light source unit that outputs compensation light that remains outside the output space;
   a second light receiving unit that receives the compensation light; and
   a position detection unit that detects the position of the target object based on a first difference between first received light intensity in the first light receiving unit and second received light intensity in the second light receiving unit.

2. The optical position detection device according to claim 1, further comprising:
   a compensation light source control unit that controls the compensation light source unit so that the second received light intensity is equal to a received light intensity of the detection light reflected by an object other than the target object.

3. The optical position detection device according to claim 1, wherein
   the light source drive unit executes a first operation of allowing a part of the plural detection light sources to output the detection light and a second operation of allowing the other part of the detection light sources to output the detection light, and
   the position detection unit detects the position of the target object based on a second difference between third received light intensity in the first light receiving unit and fourth received light intensity in the second light receiving unit at the first operation, and a third difference between fifth received light intensity in the first light receiving unit and sixth received light intensity in the second light receiving unit at the second operation.

4. The optical position detection device according to claim 3, wherein
   the position detection unit controls the light source drive unit so that the second difference and the third difference are equal, and detects the position of the target object based on a first drive condition for the detection light sources at the first operation and a second drive condition for the detection light sources at the second operation, and first output intensity of the compensation light changes, at the first operation, in conjunction with second output intensity of the detection light output from the detection light sources at the first operation, and the first output intensity changes, at the second operation, in conjunction with third output intensity of the detection light output from the detection light sources at the second operation.

5. The optical position detection device according to claim 4, wherein the light source drive unit supplies power, at the first operation, to the detection light sources that output the detection light at the first operation and to the compensation light source unit, and the light source drive unit supplies power, at the second operation, to the detection light sources that output detection light at the second operation and to the compensation light source unit.

6. The optical position detection device according to claim 5, further comprising:

a compensation drive current setting unit that respectively defines a first ratio between a first drive current supplied to the detection light sources and a second drive current supplied to the compensation light source unit at the first operation and a second ratio between a third drive current supplied to the detection light sources and a fourth drive current supplied to the compensation light source unit at the second operation.

7. The optical position detection device according to claim 6, wherein the compensation light source unit includes a first compensation light source that outputs first compensation light as the compensation light at the first operation and a second compensation light source that outputs second compensation light as the compensation light at the second operation.

8. The optical position detection device according to claim 1, wherein the first light receiving unit is a first photoelectric conversion element, and the second light receiving unit is a second photoelectric conversion element electrically connected in parallel with opposite polarity to the first photoelectric conversion element.

9. An apparatus with a position detection function comprising:

the optical position detection device according to claim 1; and a visual surface component member having a visual surface.

10. An optical position detection apparatus that detects a position of a target object, comprising:

plural detection light sources that output detection light;

a light source drive unit that drives the plural detection light sources;

a first light receiving unit that receives the detection light reflected by the target object located in an output space of the detection light;

a compensation light source unit that outputs compensation light having weaker intensity than that of the detection light;

a second light receiving unit that receives the compensation light; and a position detection unit that detects the position of the target object based on a difference between first received light intensity in the first light receiving unit and second received light intensity in the second light receiving unit.

* * * * *